United States Patent
Sasaki

(10) Patent No.: US 9,281,511 B2
(45) Date of Patent: Mar. 8, 2016

(54) BATTERY CELL AND DEVICE PROVIDED WITH THE BATTERY CELL

(75) Inventor: Takeshi Sasaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 625 days.

(21) Appl. No.: 13/576,686

(22) PCT Filed: Apr. 18, 2011

(86) PCT No.: PCT/JP2011/059563
§ 371 (c)(1),
(2), (4) Date: Aug. 2, 2012

(87) PCT Pub. No.: WO2011/132650
PCT Pub. Date: Oct. 27, 2011

(65) Prior Publication Data
US 2012/0301761 A1    Nov. 29, 2012

(30) Foreign Application Priority Data

Apr. 19, 2010    (JP) .................................. 2010-096239

(51) Int. Cl.
*H01M 4/00* (2006.01)
*H01M 2/26* (2006.01)
*H01M 10/04* (2006.01)
*H01M 2/20* (2006.01)
(Continued)

(52) U.S. Cl.
CPC .............. *H01M 2/263* (2013.01); *H01M 2/206* (2013.01); *H01M 6/10* (2013.01); *H01M 10/0431* (2013.01); *H01M 10/0587* (2013.01); *H01M 2006/106* (2013.01)

(58) Field of Classification Search
None
See application file for complete search history.

(56) References Cited

U.S. PATENT DOCUMENTS

| 7,763,377 | B2 | 7/2010 | Kozuki |
| 2003/0129479 | A1 | 7/2003 | Munenaga et al. |
| 2005/0277022 | A1 | 12/2005 | Kozuki |

(Continued)

FOREIGN PATENT DOCUMENTS

| CN | 1713438 | 12/2005 |
| CN | 1716658 | 1/2006 |

(Continued)

OTHER PUBLICATIONS

International Search Report for PCT/JP2011/059563 dated Jul. 12, 2011.

(Continued)

*Primary Examiner* — Ula C Ruddock
*Assistant Examiner* — Matthew Van Oudenaren
(74) *Attorney, Agent, or Firm* — Rankin, Hill & Clark LLP

(57) ABSTRACT

The battery cell have a first and a second current collector, wherein the first current collector is connected to part of both of, part of any one of, or the whole of any one of a pair of positive-electrode layer stack sections of an electrode assembly, the second current collector is connected to part of both of, part of any one of, or the whole of any one of a pair of negative-electrode layer stack sections, and a connecting location between the first current collector and the positive-electrode layer stack sections and a connecting location between the second current collector and the negative-electrode layer stack sections are set so as to be asymmetrical to each other with respect to a second virtual plane.

18 Claims, 13 Drawing Sheets

(51) Int. Cl.
 *H01M 6/10* (2006.01)
 *H01M 10/0587* (2010.01)

(56) References Cited

U.S. PATENT DOCUMENTS

2005/0287431 A1* 12/2005 Cho ............................. 429/161
2007/0009793 A1* 1/2007 Kim et al. .................... 429/175

FOREIGN PATENT DOCUMENTS

| | | |
|---|---|---|
| CN | 200976377 | 11/2007 |
| JP | 2000-150306 | 5/2000 |
| JP | 2002-042773 | 2/2002 |
| JP | 2002-100340 | 4/2002 |
| JP | 2003-173765 | 6/2003 |
| JP | 2003-173765 A | 6/2003 |
| JP | 2003-249423 | 9/2003 |
| JP | 2003-346774 | 12/2003 |
| JP | 2003-346882 | 12/2003 |
| JP | 2006-12830 | 1/2006 |
| JP | 2006-12830 A | 1/2006 |
| JP | 3127610 | 11/2006 |
| JP | 2007-188746 | 7/2007 |
| JP | 2009-099488 | 5/2009 |
| JP | 2009-105074 | 5/2009 |
| JP | 2009-205864 | 9/2009 |
| JP | 2010-073408 | 4/2010 |
| KR | 10-2005-0121906 | 12/2005 |
| WO | 2010/001975 | 1/2010 |

OTHER PUBLICATIONS

Extended European Search Report dated Oct. 17, 2014 issued in the corresponding European patent application No. 11771985.6.
International Preliminary Report on Patentability, English Translation of the International Report on Patentability, Notification of Transmittal, for International Application No. PCT/JP2011/059563, 16 pages.

* cited by examiner

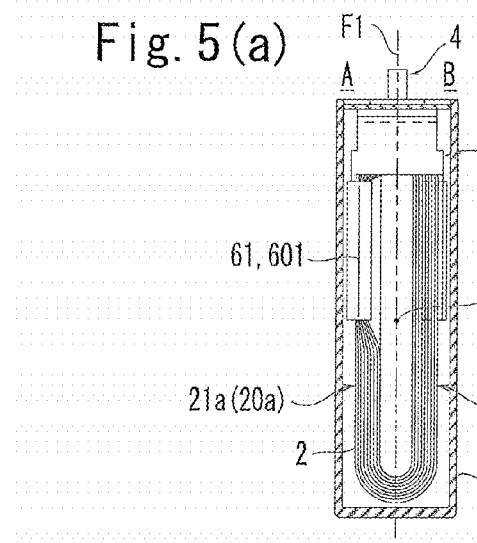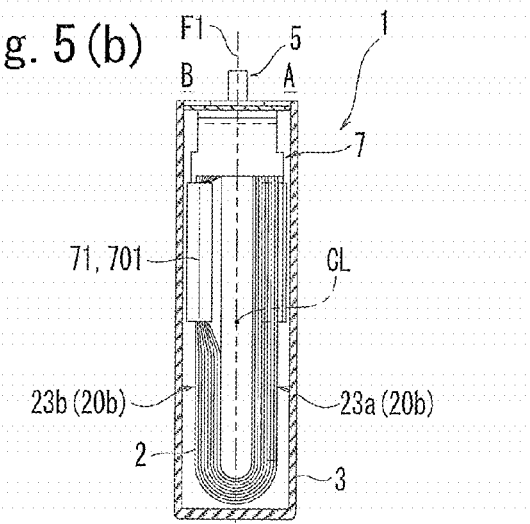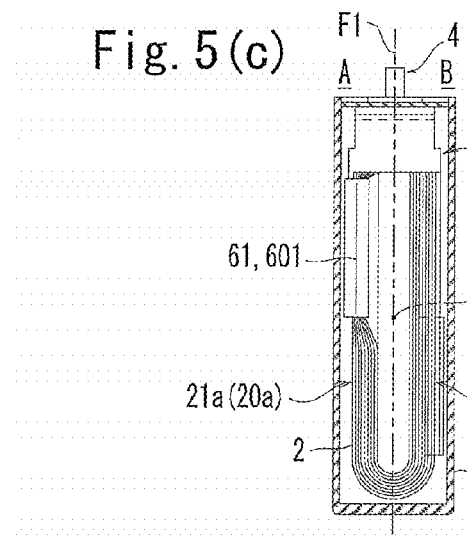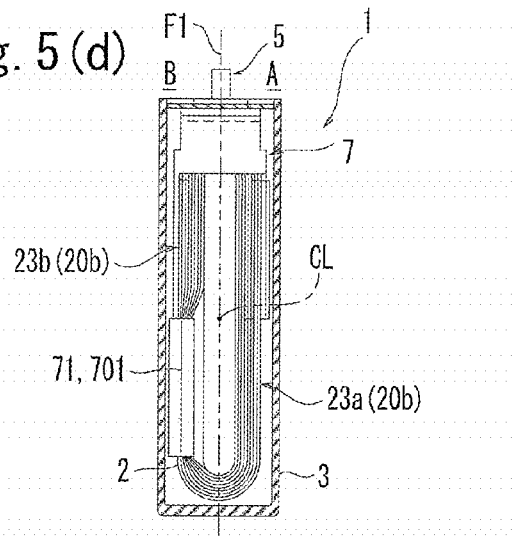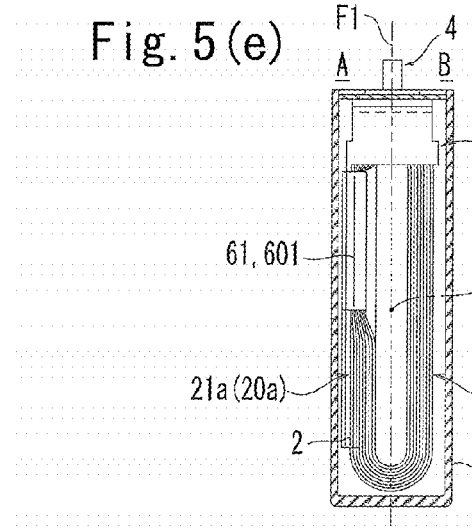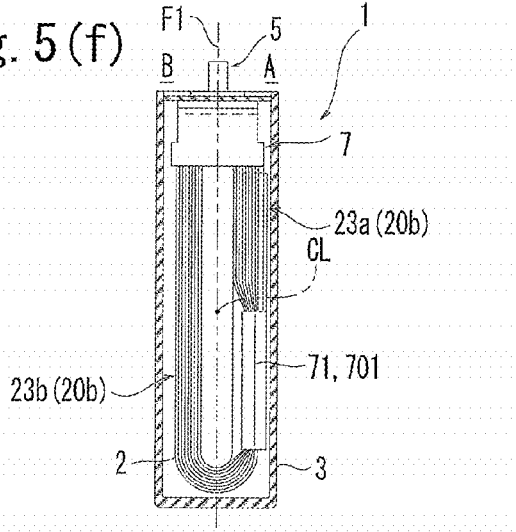

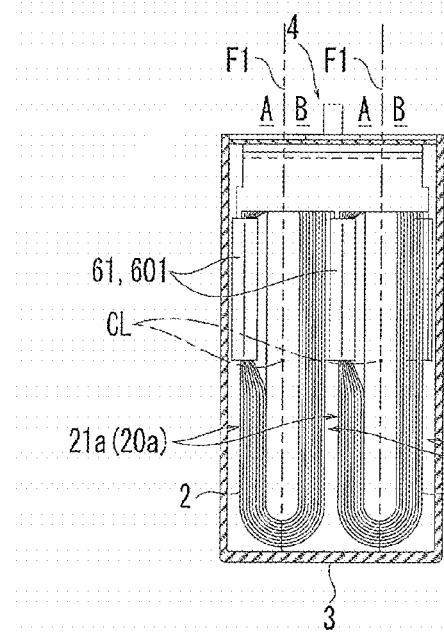
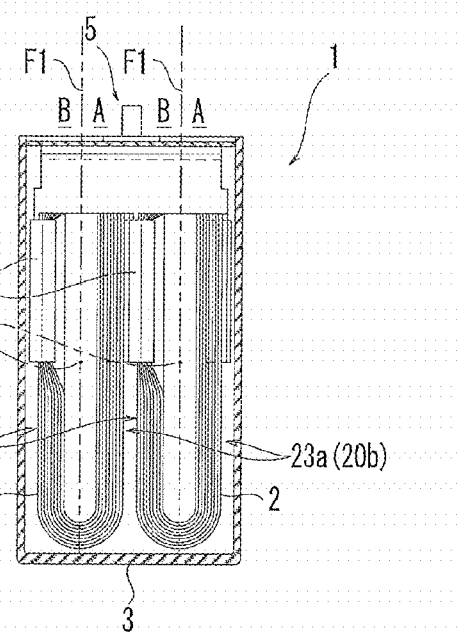
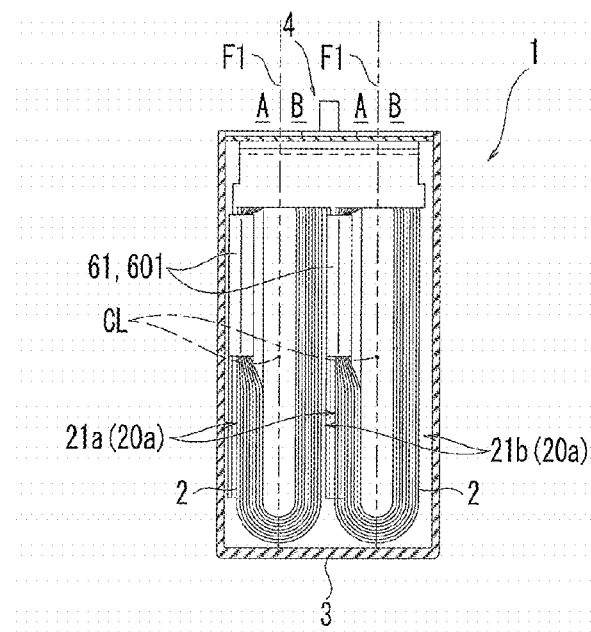
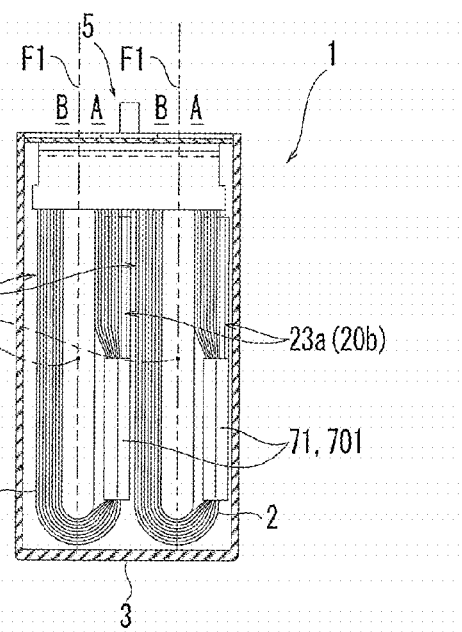

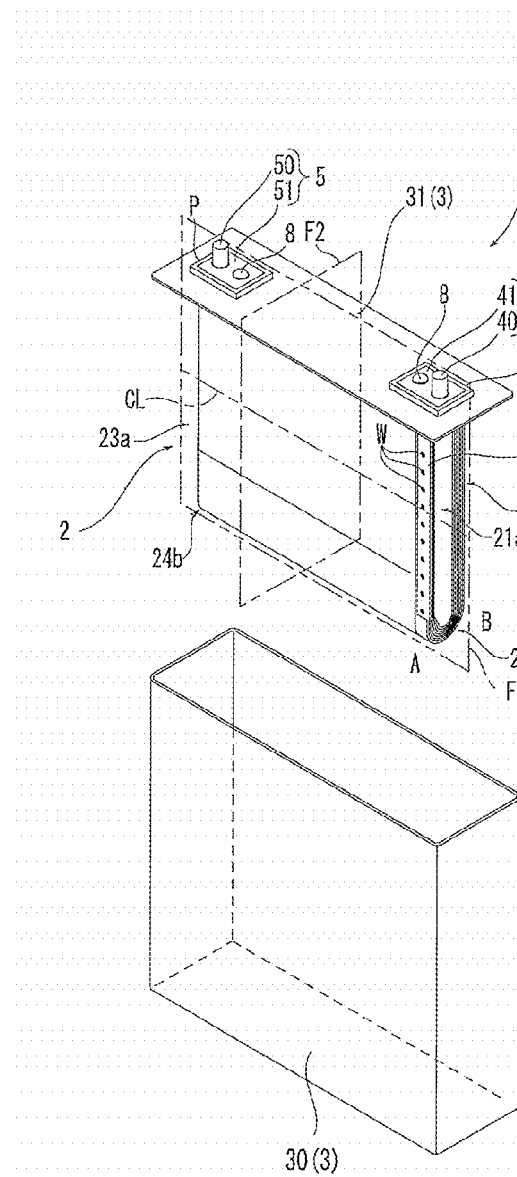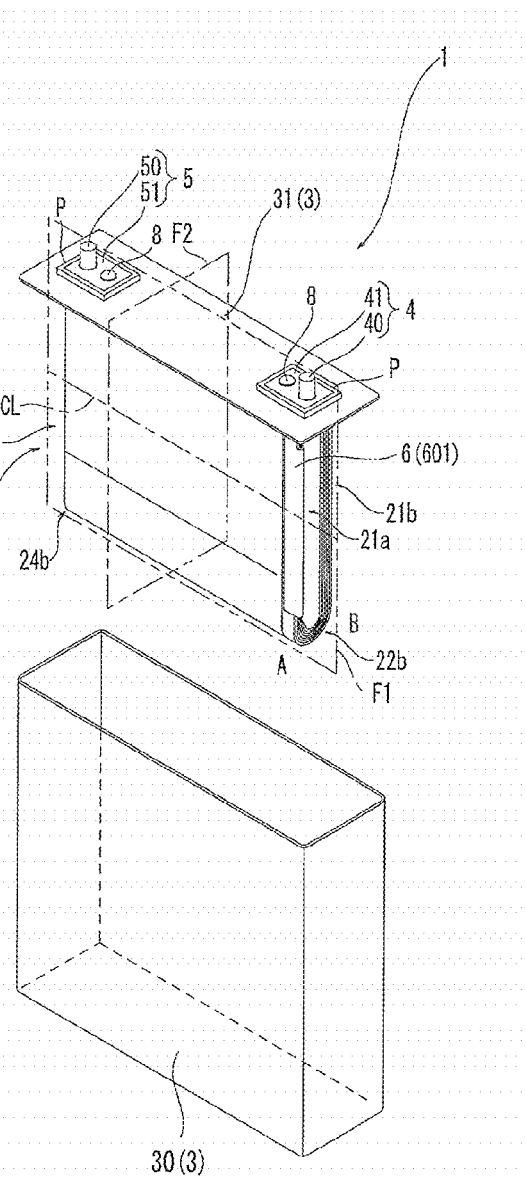

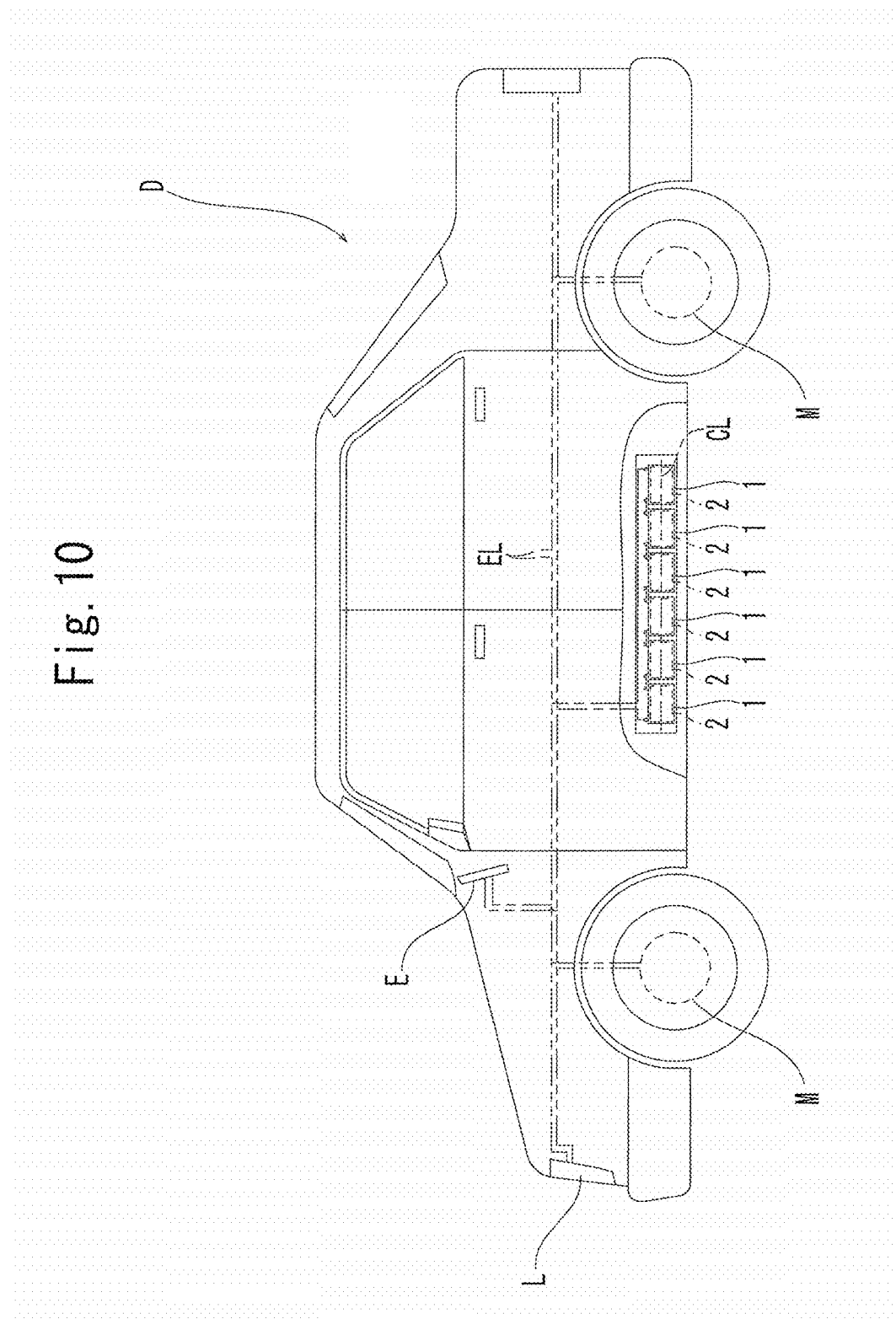

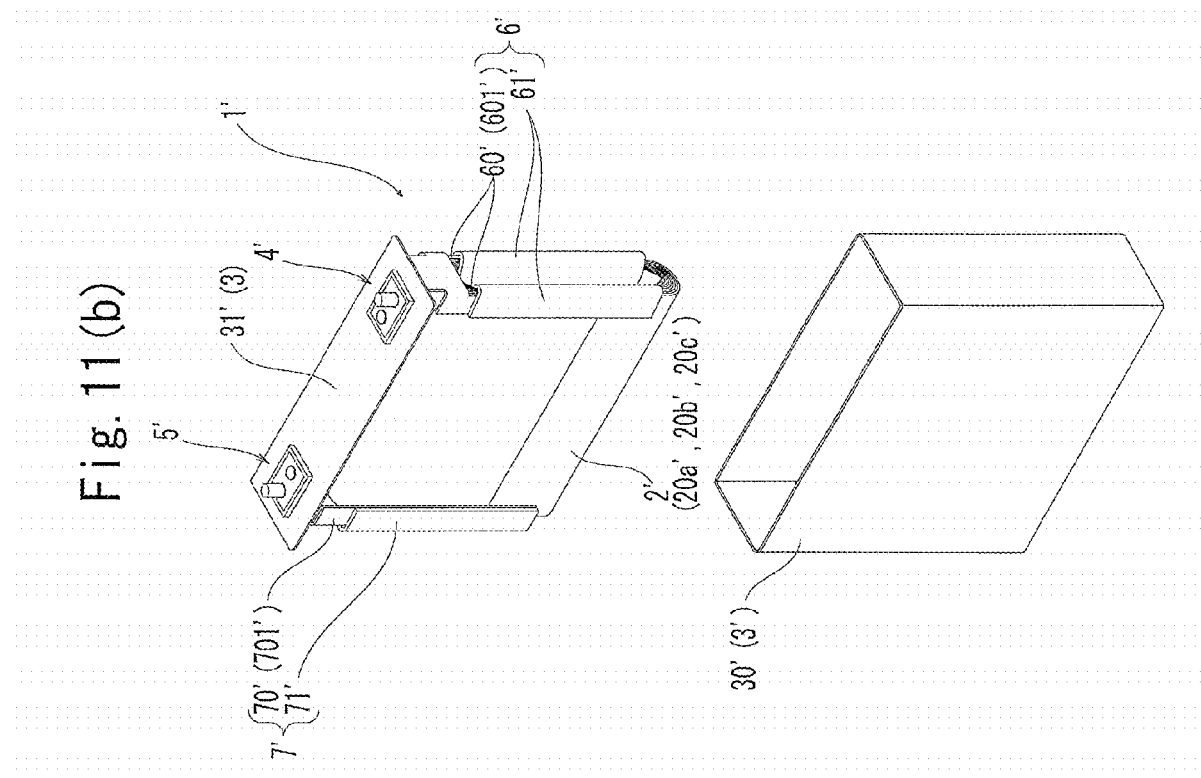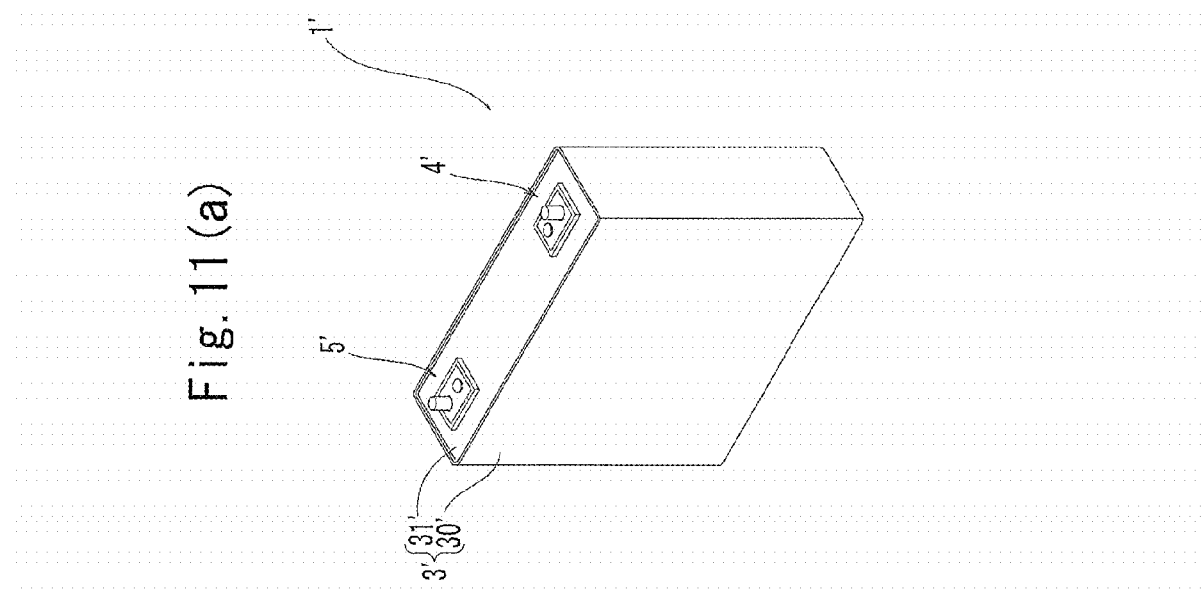

US 9,281,511 B2

BATTERY CELL AND DEVICE PROVIDED WITH THE BATTERY CELL

FIELD OF THE INVENTION

The present invention relates to a battery cell and a device provided with the battery cell, and more particularly, to a battery cell in which an external terminal structure and an electrode assembly respectively disposed outside and inside a cell case are electrically connected to each other through a current collector, and a device provided with the battery cell.

RELATED ART

Conventionally, there have been provided various types of battery cells. As one of the battery cells, there is known a battery cell provided with external terminal structures 4' and 5' to which a connection object (not illustrated), such as a cable or a bus bar, can be electrically connected as illustrated in FIG. 11(a).

In this type of battery cell 1', as illustrated in FIG. 11(b), an electrode assembly 2' is housed in a cell case 3', and current collectors 6' and 7' electrically connected to the electrode assembly 2' are electrically connected to external terminal structures 4' and 5' arranged outside the cell case 3'.

By way of more specific description, this type of battery cell 1' is provided with at least one electrode assembly 2' formed by flatly winding a band-shaped positive electrode 20a' and a band-shaped negative electrode 20b' stacked with a separator 20c' therebetween, a cell case 3' in which the electrode assembly 2' is housed, a positive-electrode external terminal structure 4' arranged outside the cell case 3', a negative-electrode external terminal structure 5' arranged outside the cell case 3', a first current collector 6' electrically connected to one end portion (a layer stack composed only of the band-shaped positive electrode 20a') of the electrode assembly 2' in the width direction thereof and also electrically connected to the positive-electrode external terminal structure 4', and a second current collector 7' electrically connected to the other end portion (a layer stack composed only of the band-shaped negative electrode 20b') of the electrode assembly 2' in the width direction thereof and also electrically connected to the negative-electrode external terminal structure 5', as illustrated in FIG. 12.

In this type of battery cell 1', as illustrated in FIGS. 13(a) and 13(b), the first current collector 6' is connected to the whole of both of a pair of positive-electrode layer stack sections 21a' and 21b', of one end portion (a layer stack composed only of the band-shaped positive electrode 20a') of the electrode assembly 2' in the width direction thereof, the pair of positive-electrode layer stack sections 21a' and 21b' extending in the cross-sectionally long axis direction of the electrode assembly 2' respectively in two regions A' and B' bounded by a first virtual plane F1' passing through a winding center CL' of the electrode assembly 2' and spreading in the long axis direction. In addition, in this type of battery cell 1', as illustrated in FIGS. 13(c) and 13(d), the second current collector 7' is connected to the whole of both of a pair of negative-electrode layer stack sections 23a' and 23b', of the other end portion (a layer stack composed only of the band-shaped negative electrode 20b') of the electrode assembly 2' in the width direction thereof, the pair of negative-electrode layer stack sections 23a' and 23b' extending in the long axis direction respectively in the two regions A' and B'.

Specifically, various types of current collectors 6' and 7' are adopted in this type of battery cell 1'. For example, as illustrated in FIG. 12, there may be adopted current collectors 6' and 7' provided with current collector bodies 60' and 70' including bases 600' and 700' fixed to the cell case 3' (a cover plate 31' for closing an open portion of the case body 30' one surface of which is opened in order to house the electrode assembly 2') through connecting means (for example, a rivet) 8', and pairs of electrode assembly attachment portions 601' and 601' and 701' and 701' provided in continuity with one ends of the bases 600' and 700' and arranged along one end portion or the other end portion (a pair of positive-electrode layer stack sections 21a' and 21b' or a pair of negative-electrode layer stack sections 23a' and 23b') of the electrode assembly 2' in the width direction thereof, and clip members 61' and 71' for coupling the respective electrode assembly attachment portions 601' and 601' and 701' and 701' with one end portion or the other end portion (positive-electrode layer stack sections 21a' and 21b' or negative-electrode layer stack sections 23a' and 23b') of the electrode assembly 2'.

In these types of current collectors 6' and 7', the clip members 61' and 71' are formed by bending a plate material into a V-shape or U-shape. Thus, the current collectors 6' and 7' are configured to bring the electrode assembly attachment portions 601' and 601' and 701' and 701' into contact with the whole of the positive-electrode layer stack sections 21a' and 21b' or the negative-electrode layer stack sections 23a' and 23b' of the electrode assembly 2' and electrically connect these parts and portions to each other by caulking the clip members 61' and 71', so as to bring each pair of opposed pieces 610a' and 610b' and 710a' and 710b' close to each other, with the whole of the positive-electrode layer stack sections 21a' and 21b' or the negative-electrode layer stack sections 23a' and 23b' interposed among the opposed pieces 610a', 610b', 710a' and 710b' of the clip members 61' and 71' along with the electrode assembly attachment portions 601' and 601' and 701' and 701'.

In addition, as another pair of current collectors 6' and 7', though not illustrated, there may be adopted current collectors 6' and 7' (those composed only of the current collector bodies 60' and 70' of the abovementioned current collectors 6' and 7') including bases 600' and 700' fixed to the cell case 3' (cover plate 31') through connecting means 8' and pairs of the electrode assembly attachment portions 601' and 601' and 701' and 701' provided in continuity with one ends of the bases 600' and 700' and arranged along one end portion or the other end portion (a pair of positive-electrode layer stack sections 21a' and 21b' or a pair of negative-electrode layer stack sections 23a' and 23b') of the electrode assembly 2' in the width direction thereof.

These types of current collectors 6' and 7' are configured so as to be electrically connected to the electrode assembly 2' by integrally welding each of the pair of electrode assembly attachment portions 601' and 601' and 701' and 701' to one end portion or the other end portion (a pair of positive-electrode layer stack sections 21a' and 21b' or a pair of negative-electrode layer stack sections 23a' and 23b') of the electrode assembly 2', or by caulking each of the pair of electrode assembly attachment portions 601' and 601' and 701' and 701', so as to circumvolute one end portion or the other end portion (positive-electrode layer stack sections 21a' and 21b' or negative-electrode layer stack sections 23a' and 23b') of the electrode assembly 2'.

Consequently, this type of battery cell 1' is configured so that electricity from the electrode assembly 2' is conducted to the positive-electrode external terminal structure 4' and the negative-electrode external terminal structure 5' through the current collectors 6' and 7' and connecting means 81' (see, for example, Patent Document 1).

CITATION LIST

Patent Document

Patent Document 1: Japanese Patent Laid-Open No. 2003-346774

DISCLOSURE OF THE INVENTION

Problems to be Solved by the Invention

Incidentally, in this type of battery cell 1', an electrolytic solution is filled in the cell case 3' in which the electrode assembly 2' is housed. In this regard, however, the electrolytic solution may have difficulty in infiltrating into the electrode assembly 2' (into between the band-shaped positive electrode 20a' and the separator 20c' and into between the band-shaped negative electrode 20b' and the separator 20c') at the time of manufacture. Thus, adequate output power may not be obtained at an early stage.

Specifically, in every battery cell 1' of this type, the current collectors 6' and 7' are configured so that, irrespective of the configuration thereof, the pair of electrode assembly attachment portions 601' and 601' of the first current collector 6' is connected to the whole of both of the pair of positive-electrode layer stack sections 21a' and 21b' on one end side of the electrode assembly 2' in the width direction thereof, and the pair of the electrode assembly attachment portions 701' and 701' of the second current collector 7' is connected to the whole of both of the pair of the negative-electrode layer stack sections 23a' and 23b' on the other end side of the electrode assembly 2' in the width direction thereof, as illustrated in FIGS. 13(*a*) to 13(*d*). Accordingly, the pair of the positive-electrode layer stack sections 21a' and 21b' and the pair of the negative-electrode layer stack sections 23a' and 23b', except both end portions in the cross-sectionally long axis direction thereof, are in a closed state at both end portions of the electrode assembly 2' in the width direction thereof.

For that reason, in this type of battery cell 1', an electrolytic solution may have difficulty in filling the inside of the electrode assembly 2' (into between the band-shaped positive electrode 20a' and the separator 20c' and into between the band-shaped negative electrode 20b' and the separator 20c'). Thus, it may not be possible to secure stable output power.

In this type of battery cell 1', gases are generated at the time of electrical charge (at the time of initial electrical charge, in particular) due to the chemical reaction of the electrolytic solution. Since the pair of the positive-electrode layer stack sections 21a' and 21b' and the pair of the negative-electrode layer stack sections 23a' and 23b' are in a closed state at both end portions of the electrode assembly 2' in the width direction thereof, as described above, the generated gases have difficulty in escaping from within the electrode assembly 2' (from between the band-shaped positive electrode 20a' and the separator 20c' and from between the band-shaped negative electrode 20b' and the separator 20c'). Thus, it may not be possible to secure stable output power.

Hence, it is an object of the present invention, in view of such circumstances as described above, to provide a battery cell capable of efficiently performing infiltration of an electrolytic solution into an electrode assembly and exhaust of gases within the electrode assembly generated during electrical charge and making stable output power available, and a device equipped with the battery cell.

Means for Solving Problems

A battery cell according to the present invention comprises:

at least one electrode assembly formed by flatly winding a band-shaped positive electrode and a band-shaped negative electrode stacked with a separator therebetween;

a cell case in which the electrode assembly is housed;

a positive-electrode external terminal structure arranged outside the cell case;

a negative-electrode external terminal structure arranged outside the cell case;

a first current collector electrically connected to a layer stack composed only of the band-shaped positive electrode and located on one end side of the electrode assembly in the width direction thereof, and electrically connected to the positive-electrode external terminal structure; and a second current collector electrically connected to a layer stack composed only of the band-shaped negative electrode and located on the other end side of the electrode assembly in the width direction thereof, and electrically connected to the negative-electrode external terminal structure, wherein the first current collector is connected to any one of: part of both of a pair of positive-electrode layer stack sections; part of any one of the pair of positive-electrode layer stack sections; and the whole of any one of the pair of the positive-electrode layer stack sections, of the layer stack composed only of the band-shaped positive electrode, the pair of the positive-electrode layer sections extending in a cross-sectional long axis direction of the electrode assembly respectively in two regions bounded by a first virtual plane passing through a winding center of the electrode assembly and spreading in the long axis direction, the second current collector is connected to any one of: part of both of a pair of negative-electrode layer stack sections; part of any one of the pair of negative-electrode layer stack sections; and the whole of any one of the pair of the negative-electrode layer stack sections, of the layer stack composed only of the band-shaped negative electrode, the pair of the negative-electrode layer stack sections extending in the long axis direction respectively in the two regions, and a connecting location between the first current collector and the positive-electrode layer stack section and a connecting location between the second current collector and the negative-electrode layer stack section are set so as to be asymmetrical to each other with respect to a second virtual plane passing through a center of the electrode assembly in the width direction thereof and being orthogonal to the first virtual plane.

Note that the term "part" as used herein means that a part to which the current collector is connected is partial. "Part" is a concept including, for example, the notion that a part of a single positive-electrode layer stack section or negative-electrode layer stack section to which the current collector is connected is longer than parts excluded from connection in the long axis direction and that a part of a single positive-electrode layer stack section or negative-electrode layer stack section to which the current collector is connected is shorter than parts excluded from connection in the long axis direction. In other words, "part" means that a part to which the current collector is connected is not the whole of the positive-electrode layer stack section or the negative-electrode layer stack section.

According to the battery cell configured as described above, the first current collector is connected to any one of: part of both of a pair of positive-electrode layer stack sections; part of one of the pair of positive-electrode layer stack sections; and the whole of one of the pair of the positive-electrode layer stack sections, of the layer stack composed only of the band-shaped positive electrode, the pair of the positive-electrode layer stack sections extending in a cross-sectional long axis direction of the electrode assembly respectively in two regions bounded by a first virtual plane passing through a winding center of the electrode assembly and spreading in a long axis direction of the electrode assembly, the second current collector is connected to any one of: part of both of a pair of negative-electrode layer stack sections; part of one of the pair of negative-electrode layer stack sections; and the whole of one of the pair of the negative-electrode layer stack sections, of the layer stack composed only of the band-shaped negative electrode, the pair of the negative-electrode layer stack sections extending in the long axis direction respectively in the two regions, and a connecting location between the first current collector and the positive-electrode layer stack section and a connecting location between the second current collector and the negative-electrode layer stack section are set so as to be asymmetrical to each other with respect to a second virtual plane passing through a center of the electrode assembly in the width direction thereof and being orthogonal to the first virtual plane.

Consequently, at least a layer stack composed only of the band-shaped negative electrode and located in a position symmetrical to the connecting location between the first current collector and the positive-electrode layer stack section with respect to the second virtual plane is held in an open state. Likewise, at least a layer stack composed only of the band-shaped positive electrode and located in a position symmetrical to the connecting location between the second current collector and the negative-electrode layer stack section with respect to the second virtual plane is held in an open state.

Consequently, the battery cell configured as described above makes it easy for an electrolytic solution filled in the cell case to flow from open parts (parts in which the band-shaped positive electrode, the separator and the band-shaped negative electrode are not sealed together) located at both end portions of the electrode assembly into the electrode assembly (into between the band-shaped positive electrode, the separator, and the band-shaped negative electrode) and consequently fill the inside of the electrode assembly. In addition, as described above, the layer stack composed only of the band-shaped negative electrode and located in a position symmetrical to the connecting location between the first current collector and the positive-electrode layer stack section with respect to the second virtual plane is held in an open state. Likewise, the layer stack composed only of the band-shaped positive electrode and located in a position symmetrical to the connecting location between the second current collector and the negative-electrode layer stack section with respect to the second virtual plane is held in an open state. Accordingly, the battery cell configured as described above can smoothly exhaust gases within the electrode assembly out of both open-state end portions of the electrode assembly, even if the gases are generated within the electrode assembly due to electrical charge. Consequently, the battery cell configured as described above can efficiently perform infiltration of the electrolytic solution into the electrode assembly and exhaust of the gases generated within the electrode assembly during electrical charge. Thus, it is possible to obtain stable output power.

The battery cell according to the present invention may have a configuration in which:

the first current collector is connected to part or the whole of one positive-electrode layer stack section located in one region of the two regions, and the second current collector is connected to part or the whole of the other negative-electrode layer stack section located in the other region on the opposite side of the one region of the two regions.

By this way of configuration, at least the other positive-electrode layer stack section of the pair of the positive-electrode layer stack sections at one end portion of the electrode assembly is held in an open state, and at least one negative-electrode layer stack section of the pair of negative-electrode layer stack sections at the other end portion of the electrode assembly is also held in an open state. Thus, an electrolytic solution can be made to infiltrate from the respective open parts to fill the inside of the electrode assembly. In addition, gases generated within the electrode assembly during electrical charge can be exhausted from the respective open parts.

The battery cell according to the present invention may have a configuration in which:

the first current collector is connected to a side lower than an upper portion of the positive-electrode layer stack section in the long axis direction thereof, and the second current collector is connected to a side lower than an upper portion of the negative-electrode layer stack section in the long axis direction thereof.

By this way of configuration, gases generated during electrical charge can be exhausted efficiently. That is, in addition to the layer stack composed only of the band-shaped negative electrode and located in the position symmetrical to the connecting location between the first current collector and the positive-electrode layer stack section with respect to the second virtual plane and the layer stack composed only of the band-shaped positive electrode and located in the position symmetrical to the connecting location between the second current collector and the negative-electrode layer stack section with respect to the second virtual plane, a layer stack composed only of the band-shaped positive electrode and located upper than the connecting location between the first current collector and the positive-electrode layer stack section and a layer stack composed only of the band-shaped negative electrode and located upper than the connecting location between the second current collector and the negative-electrode layer stack section are also held in an open state. Consequently, gases generated during electrical charge and moving upward within the electrode assembly due to a buoyant force can be efficiently exhausted from both end portions of the electrode assembly.

The battery cell according to the present invention may have a configuration in which:

the first current collector is connected to part of one positive-electrode layer stack section located in any one region of the two regions, and the second current collector is connected to part of one negative-electrode layer stack section located in any one region of the two regions.

By this way of configuration, the band-shaped positive electrode layers of the positive-electrode layer stack section located in positions other than the connecting location with the first current collector, which section includes a portion of the positive-electrode layer stack section (layer stack composed only of the band-shaped positive electrode) located in a position symmetrical to the connecting location between the second current collector and the negative-electrode layer stack section with respect to the second virtual plane are held in an open state. Likewise, the band-shaped negative electrode layers of the negative-electrode layer stack section located in positions other than the connecting location with the second current collector, which section includes a portion of the negative-electrode layer stack section (layer stack composed only of the band-shaped negative electrode) located in a position symmetrical to the connecting location between the first current collector and the positive-electrode layer stack section with respect to the second virtual plane are also held in an open state.

Accordingly, in the battery cell configured as described above, an electrolytic solution can be efficiently made to infiltrate from the open-state positive-electrode layer stack section (from between the band-shaped positive electrode layers) and the open-state negative-electrode layer stack section (from between the band-shaped negative electrode layers) into the electrode assembly. In addition, gases generated within the electrode assembly due to electrical charge can be efficiently exhausted from the open-state positive-electrode layer stack (from between the band-shaped positive electrode layers) and the open-state negative-electrode layer stack (from between the band-shaped negative electrode layers).

In this type of battery cell, the electrode assembly (band-shaped positive and negative electrodes) undergoes expansion and contraction during electrical charge and discharge. In the battery cell configured as described above, the rest of the positive-electrode layer stack section (the band-shaped positive electrode layers) located in positions other than the connecting location with the first current collector and the rest of the negative-electrode layer stack section (the band-shaped negative electrode layers) located in positions other than the connecting location with the second current collector are held in an open state. Consequently, it is possible to release stress to be worked upon the electrode assembly (band-shaped positive and negative electrodes) due to electrical charge and discharge (expansion and contraction), and improve battery cell life.

If the battery cell is installed so that the long axis direction of the electrode assembly is oriented vertically, the first current collector may be connected to an upper portion or a lower portion of one positive-electrode layer stack section located in one of the two regions of the electrode assembly, and the second current collector may be connected to an upper portion or lower portion of the other negative-electrode layer stack section located in the other region on the opposite side of the one of the two regions of the electrode assembly.

By this way of configuration, all the band-shaped negative electrode layers of the negative-electrode layer stack section located in the same region as the positive-electrode layer stack section to which the first current collector is connected are held in an open state (held spaced apart from each other), and all the band-shaped positive electrode layers of the positive-electrode layer stack section located in the same region as the negative-electrode layer stack section to which the second current collector is connected are held in an open state (held spaced apart from each other).

Consequently, the battery cell configured as described above enables an electrolytic solution to efficiently infiltrate from the open-state positive-electrode layer stack section (from between the band-shaped positive electrode layers) and the open-state negative-electrode layer stack section (from between the band-shaped negative electrode layers) into the electrode assembly. In addition, gases generated within the electrode assembly due to electrical charge can be efficiently exhausted from the open-state positive-electrode layer stack section (from between the band-shaped positive electrode layers) and the open-state negative-electrode layer stack section (from between the band-shaped negative electrode layers). In particular, the battery cell configured as described above makes it easy for the electrolytic solution to circulate in the electrode assembly and facilitates exhaust of gases generated within the electrode assembly, since the region in which the first current collector is connected and the region in which the second current collector is connected differ from each other.

In a case where the battery cell is installed so that the long axis direction of the electrode assembly is oriented vertically, the first current collector may be connected to one of upper and lower portions of one positive-electrode layer stack section located in one of the two regions of the electrode assembly, and the second current collector may be connected to the other one of upper and lower portions of the negative-electrode layer stack section located in one of the two regions of the electrode assembly.

By this way of configuration, the band-shaped positive electrode layers of a part (the other one of the upper and lower portions) of the positive-electrode layer stack section located in one of the two regions other than the part thereof to which the first current collector is connected and the band-shaped positive electrode layers of the positive-electrode layer stack section located in the other one of the two regions are held in an open state (held spaced apart from each other). Likewise, the band-shaped negative electrode layers of a part (one of the upper and lower portions) of the negative-electrode layer stack section located in one of the two regions other than the part to which the second current collector is connected, and the band-shaped negative electrode layers of the negative-electrode layer stack section located in the other one of the two regions are held in an open state (held spaced apart from each other).

Accordingly, in the battery cell configured as described above, an electrolytic solution can be efficiently made to infiltrate from the open-state positive-electrode layer stack section (from between the band-shaped positive electrode layers) and the open-state negative-electrode layer stack section (from between the band-shaped negative electrode layers) into the electrode assembly. In addition, gases generated within the electrode assembly due to electrical charge can be efficiently exhausted from the open-state positive-electrode layer stack section (from between the band-shaped positive electrode layers) and the open-state negative-electrode layer stack section (from between the band-shaped negative electrode layers).

In particular, in the battery cell configured as described above, the connecting location between the electrode assembly and the first current collector and the connecting location between the electrode assembly and the second current collector differ in arrangement with respect to the vertical direction. Accordingly, the location of an open part of the positive-electrode layer stack section to which the first current collector is connected and the location of an open part of the negative-electrode layer stack section to which the second current collector is connected differ in arrangement with respect to the vertical direction. Consequently, the battery cell configured as described above makes it easy for the electrolytic solution to circulate in the electrode assembly, and facilitates exhaust of gases generated within the electrode assembly.

The battery cell according to the present invention may have a configuration in which:

the first current collector is connected to part of both of the pair of positive-electrode layer stack sections located in the two regions, and the second current collector is connected to part of both of the pair of negative-electrode layer stack sections located in the two regions.

By this way of configuration, the band-shaped positive electrode layers are made open (held spaced apart from each other) in parts other than the parts of the pair of positive-electrode layer stack sections to which the first current collector is connected, and the band-shaped negative electrode layers are made open (held spaced apart from each other) in parts other than the parts of the pair of negative-electrode layer stack sections to which the second current collector is connected. Accordingly, in the battery cell configured as described above, an electrolytic solution can be efficiently made to infiltrate from the open-state positive-electrode layer stack section (from between the band-shaped positive electrode layers) and the open-state negative-electrode layer stack section (from between the band-shaped negative electrode layers) into the electrode assembly. In addition, gases generated within the electrode assembly due to electrical charge can be efficiently exhausted from the open-state positive-electrode layer stack section (from between the band-shaped positive electrode layers) and the open-state negative-electrode layer stack section (from between the band-shaped negative electrode layers).

In addition, in the battery cell configured as described above, the first current collector is connected to one place each of the pair of positive-electrode layer stack sections, and the second current collector is connected to one place each of the pair of negative-electrode layer stack sections. Thus, it is possible to achieve high-rate discharge performance and input-output performance improvement based on a reduction in current-collecting resistance. Yet additionally, the battery cell configured as described above is such that the first current collector is connected to the pair of positive-electrode layer stack sections located respectively in the two regions bounded by the first virtual plane and the second current collector is connected to the pair of negative-electrode layer stack sections located respectively in the two regions bounded by the first virtual plane. Thus, the battery cell is superior in resistance to vibration in a direction orthogonal to the first virtual plane.

In particular, as the result of the first current collector being connected to one of respective one end sides (either the upper or lower portion if the battery cell is arranged with the long axis direction of the electrode assembly oriented vertically) of each of the pair of positive-electrode layer stack sections located in the two regions and the second current collector being connected to one of the respective other end sides (either the upper or lower portion if the battery cell is arranged with the long axis direction of the electrode assembly oriented vertically) of each of the pair of negative-electrode layer stack sections located in the two regions, the battery cell is superior in resistance to vibration in the winding center direction of the electrode assembly and in a direction orthogonal to the first virtual plane.

The battery cell according to the present invention may have a configuration in which:

the electrode assembly includes two or more electrode assemblies;

the two or more electrode assemblies are arranged in parallel with each other, so that the respective positive-electrode layer stack sections and the respective negative-electrode layer stack sections thereof are aligned to each other and the respective first virtual planes thereof are parallel or substantially parallel to each other; and the first current collector is connected to part of one positive-electrode layer stack section located in any one region of the two regions of each of the electrode assemblies, and the second current collector is connected to part of one negative-electrode layer stack section located in any one region of the two regions of each of the electrode assemblies.

By this way of configuration, it is possible to provide a high-capacity battery cell according to the number of electrode assemblies. In addition, a single first current collector and a single second current collector are connected to the two or more electrode assemblies in this configuration. Thus, it is possible to reduce the number of components.

The battery cell configured as described above is such that in each of the electrode assemblies, the band-shaped positive electrode layers of the positive-electrode layer stack section located in positions other than the connecting location with the first current collector, which section includes a portion of the positive-electrode layer stack section (a layer stack composed only of the band-shaped positive electrode) located in a position symmetrical to the connecting location between the second current collector and the negative-electrode layer stack section with respect to the second virtual plane, are held in an open state (held spaced apart from each other), and the band-shaped negative electrode layers of the negative-electrode layer stack section located in positions other than the connecting location with the second current collector, which section includes a portion of the negative-electrode layer stack section (a layer stack composed only of the band-shaped negative electrode) located in a position symmetrical to the connecting location between the first current collector and the positive-electrode layer stack section with respect to the second virtual plane, are also held in an open state (held spaced apart from each other).

Accordingly, the battery cell configured as described above allows an electrolytic solution to efficiently infiltrate from the open-state positive-electrode layer stack section (from between the band-shaped positive electrode layers) and the open-state negative-electrode layer stack section (from between the band-shaped negative electrode layers) into each of the electrode assemblies. In addition, gases generated within each of the electrode assemblies due to electrical charge can be efficiently exhausted from the open-state positive-electrode layer stack section (from between the band-shaped positive electrode layers) and the open-state negative-electrode layer stack section (from between the band-shaped negative electrode layers).

The battery cell according to the present invention may have a configuration in which:

the electrode assembly includes two or more electrode assemblies;

the two or more electrode assemblies are arranged in parallel with each other, so that the respective positive-electrode layer stack sections and the respective negative-electrode layer stack sections thereof are aligned to each other and the respective first virtual planes thereof are parallel or substantially parallel to each other; and the first current collector is connected to part of one positive-electrode layer stack section located in one region of the two regions of one of adjacent two electrode assemblies and to part of the other positive-electrode layer stack section located in the other region on the opposite side of the one region of the two regions of the other of the adjacent two electrode assemblies, and a second current collector is connected to part of the other negative-electrode layer stack section located in the other region on the opposite side of the one region of the two regions of one of the adjacent two electrode assemblies and to part of one negative-electrode layer stack section located in the one region of the two regions of the other of the adjacent two electrode assemblies.

By this way of configuration, it is possible to provide a high-capacity battery cell according to the number of electrode assemblies. In addition, a single first current collector and a single second current collector are connected to two or more electrode assemblies in this configuration. Thus, it is possible to reduce the number of components.

The battery cell configured as described above is such that in each of the electrode assemblies, the band-shaped positive electrode layers of the positive-electrode layer stack section located in positions other than the connecting location with the first current collector, which section includes a portion of the positive-electrode layer stack section (a layer stack composed only of the band-shaped positive electrode) located in a position symmetrical to the connecting location between the second current collector and the negative-electrode layer stack section with respect to the second virtual plane, are held in an open state (held spaced apart from each other), and the band-shaped negative electrode layers of the negative-electrode layer stack section located in positions other than the connecting location with the second current collector, which section includes a portion of the negative-electrode layer stack section (a layer stack composed only of the band-shaped negative electrode) located in a position symmetrical to the connecting location between the first current collector and the positive-electrode layer stack section with respect to the second virtual plane, are also held in an open state (held spaced apart from each other).

Accordingly, the battery cell configured as described above allows an electrolytic solution to efficiently infiltrate from the open-state positive-electrode layer stack section (from between the band-shaped positive electrode layers) and the open-state negative-electrode layer stack section (from between the band-shaped negative electrode layers) into each of the electrode assemblies. In addition, gases generated within each of the electrode assemblies due to electrical charge can be efficiently exhausted from the open-state positive-electrode layer stack section (from between the band-shaped positive electrode layers) and the open-state negative-electrode layer stack section (from between the band-shaped negative electrode layers).

The battery cell according to the present invention is preferably configured to be installable with the winding center of an electrode assembly extending laterally. By this way of configuration, the winding center of the electrode assembly is placed in a state of extending laterally with the battery cell installed. Thus, the height of a positive-electrode layer stack section located at one end portion of the electrode assembly in a direction in which the winding center of the electrode assembly extends and the height of a negative-electrode layer stack section located at the other end portion of the electrode assembly in the abovementioned direction are at the same or substantially the same level. Consequently, in the battery cell configured as described above, an electrolytic solution efficiently infiltrates from both ends of the winding center of the electrode assembly, and gases generated due to electrical charge and discharge are efficiently exhausted from both ends of the winding center of the electrode assembly, with the battery cell installed in a predetermined position.

According to the present invention, there is provided a device including a battery cell as a power supply source for supplying power to an electrical load, which is characterized in that the battery cell is configured using one of the above-described battery cells and installed with the winding center of an electrode assembly extending laterally. Since such a device is provided with one of the above-described battery cells as a power supply source, power supplied to the electrical load from the battery cell is stabilized, and therefore, the device can offer the highest possible performance.

More specifically, in the battery cell which the device is provided with, the band-shaped positive electrode layers of a part (the other one of the upper and lower portions) of the positive-electrode layer stack section located in one of the two regions of the electrode assembly other than the part thereof to which the first current collector is connected and the band-shaped positive electrode layers of the positive-electrode layer stack section located in the other one of the two regions of the electrode assembly are held in an open state (held spaced apart from each other). Likewise, the band-shaped negative electrode layers of a part (one of the upper and lower portions) of the negative-electrode layer stack section located in one of the two regions of the electrode assembly other than the part to which the second current collector is connected, and the band-shaped negative electrode layers of the negative-electrode layer stack section located in the other one of the two regions are held in an open state (held spaced apart from each other).

Accordingly, in the battery cell which the device is provided with, an electrolytic solution can be efficiently made to infiltrate from the open-state positive-electrode layer stack section (from between the band-shaped positive electrode layers) and the open-state negative-electrode layer stack section (from between the band-shaped negative electrode layers) into the electrode assembly. In addition, gases generated within the electrode assembly due to electrical charge can be efficiently exhausted from the open-state positive-electrode layer stack section (from between the band-shaped positive electrode) and the open-state negative-electrode layer stack section (from between the band-shaped negative electrode layers).

In particular, the battery cell which the device is provided with is installed with the winding center of the electrode assembly being placed in a state of extending laterally. Accordingly, the height of the positive-electrode layer stack section located at one end portion of the electrode assembly in a direction in which the winding center of the electrode assembly extends and the height of the negative-electrode layer stack section located at the other end portion of the electrode assembly in the abovementioned direction are at the same or substantially the same level. Consequently, in the battery cell which the device is provided with, an electrolytic solution efficiently infiltrates from both ends of the winding center of the electrode assembly, and gases generated due to electrical charge and discharge are efficiently exhausted from both ends of the winding center of the electrode assembly, with the battery cell installed in a predetermined position.

Accordingly, in the device configured as described above, power supplied to the electrical load from the battery cell is stabilized, and therefore, the device can offer the highest possible performance.

Advantages of the Invention

As described above, according to the battery cell of the present invention, there can be attained the excellent advantageous effect that it is possible to efficiently perform infiltration of the electrolytic solution into the electrode assembly and exhaust of the gases generated within the electrode assembly during electrical charge, and obtain stable output power.

In addition, according to the device of the present invention, there can be attained the excellent advantageous effect that a battery cell serving as a power supply source can efficiently perform infiltration of the electrolytic solution into the electrode assembly and exhaust of the gases generated within the electrode assembly during electrical charge. Thus, it is possible to obtain stable output power.

BRIEF DESCRIPTION OF THE DRAWINGS

FIG. 4 is a series of explanatory drawings used to describe a connecting location between an electrode assembly and a current collector in the battery cell according to the embodiment, wherein

FIG. 5 is a series of explanatory drawings used to describe a connecting location between an electrode assembly and a current collector in a battery cell according to another embodiment of the present invention, wherein FIG. 5(a) illustrates a cross-sectional view taken from one end side of the electrode assembly of the battery cell according to the another embodiment in a winding center direction of the electrode assembly, FIG. 5(b) illustrates a cross-sectional view taken from the other end side of the electrode assembly of the battery cell illustrated in FIG. 5(a) in the winding center direction of the electrode assembly, FIG. 5(c) illustrates a cross-sectional view taken from one end side of the electrode assembly of a battery cell according to yet another embodiment in the winding center direction of the electrode assembly, FIG. 5(d) illustrates a cross-sectional view taken from the other end side of the electrode assembly of the battery cell illustrated in FIG. 5(c) in the winding center direction of the electrode assembly, FIG. 5(e) illustrates a cross-sectional view taken from one end side of the electrode assembly of a battery cell according to still another embodiment in the winding center direction of the electrode assembly, and FIG. 5(f) illustrates a cross-sectional view taken from the other end side of the electrode assembly of the battery cell illustrated in FIG. 5(e) in the winding center direction of the electrode assembly.

FIG. 6 is a series of cross-sectional views used to describe a connecting location between an electrode assembly and a current collector in a battery cell according to yet another embodiment, wherein

FIG. 7 is a series of cross-sectional views used to describe a connecting location between an electrode assembly and a current collector in a battery cell according to still another embodiment, wherein FIG. 7(a) illustrates a cross-sectional view taken from one end side of the electrode assembly of the battery cell according to the still another embodiment in the winding center direction of the electrode assembly, FIG. 7(b) illustrates a cross-sectional view taken from the other end side of the electrode assembly of the battery cell illustrated in FIG. 7(a) in the winding center direction of the electrode assembly, FIG. 7(c) illustrates a cross-sectional view taken from one end side of the electrode assembly of a battery cell according to still another embodiment in the winding center direction of the electrode assembly, and FIG. 7(d) illustrates a cross-sectional view taken from the other end side of the electrode assembly of the battery cell illustrated in FIG. 7(c) in the winding center direction of the electrode assembly.

FIG. 8 is a series of cross-sectional views used to describe a connecting location between an electrode assembly and a current collector in a battery cell according to still another embodiment, wherein

FIG. 9 is a series of partially exploded perspective views of a battery cell according to still another embodiment of the present invention, wherein FIG. 9(a) illustrates an exploded perspective view of a battery cell in which a current collector and an electrode assembly are electrically connected to each other by welding an electrode assembly attachment portion of the current collector to the electrode assembly (a band-shaped positive electrode or a band-shaped negative electrode), and FIG. 9(b) illustrates an exploded perspective view of a battery cell in which a current collector and an electrode assembly are electrically connected to each other by caulking the electrode assembly attachment portion of the current collector, so as to circumvolute the electrode assembly (a band-shaped positive electrode or a band-shaped negative electrode).

FIG. 10 illustrates a schematic view of a device (electric vehicle) according to one embodiment of the present invention.

FIG. 11 is a series of perspective views of a conventional battery cell, wherein FIG. 11(a) illustrates an overall perspective view and FIG. 11(b) illustrates a partially exploded perspective view.

FIG. 13 is a series of explanatory drawings used to describe a connecting location between an electrode assembly and a current collector in the conventional battery cell, wherein

DETAILED DESCRIPTION OF THE PREFERRED EMBODIMENT

Hereinafter, a battery cell according to one embodiment of the present invention will be described while referring to the accompanying drawings.

Figure 1:
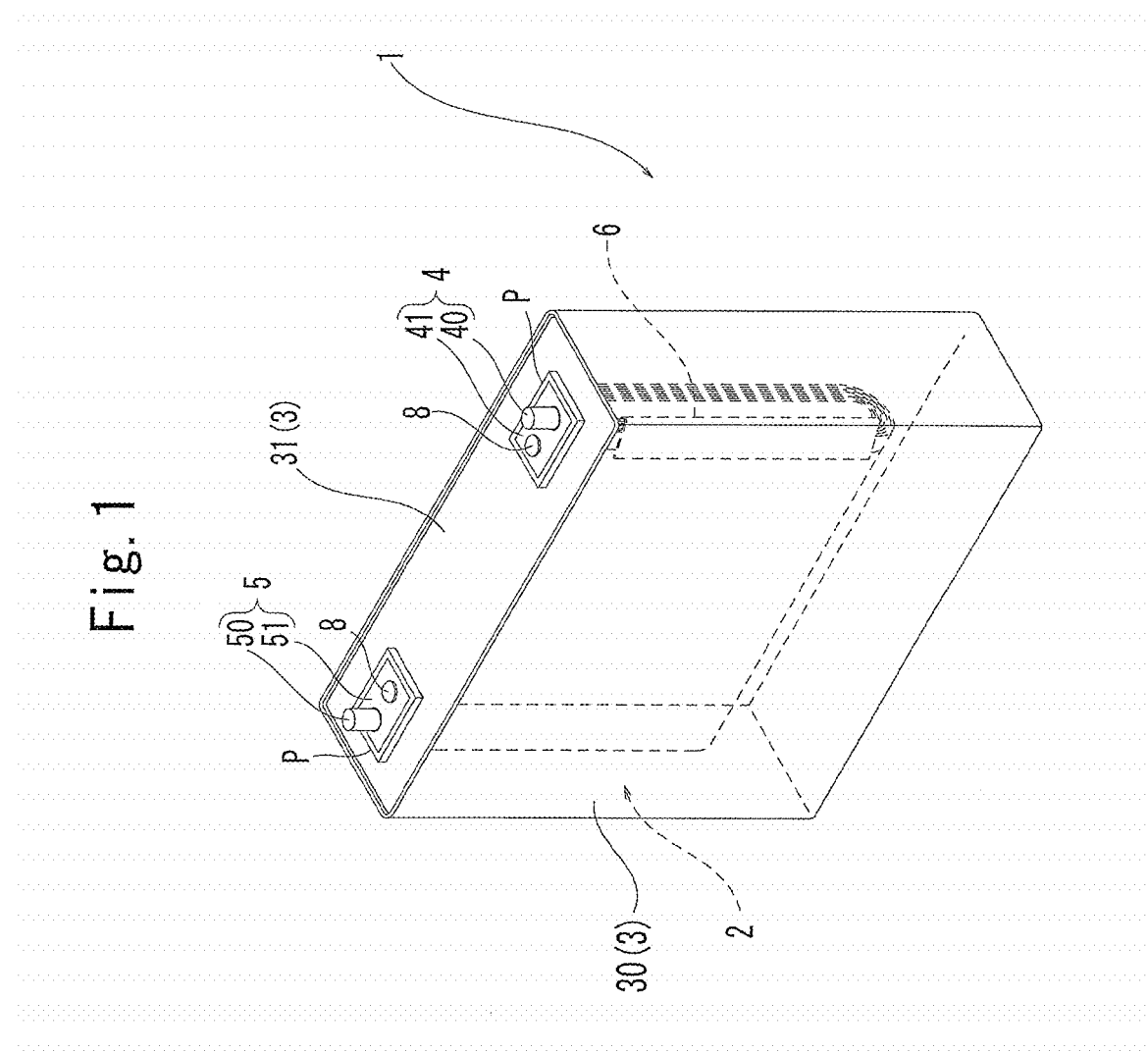
FIG. 1 illustrates an overall perspective view of a battery cell according to one embodiment of the present invention.

As illustrated in FIG. 1, the battery cell according to the present embodiment is such that an electrode assembly 2 is housed in a cell case 3, and current collectors 6 and 7 electrically connected to the electrode assembly 2 are also electrically connected to external terminal structures 4 and 5 arranged outside the cell case 3.

Figure 2:
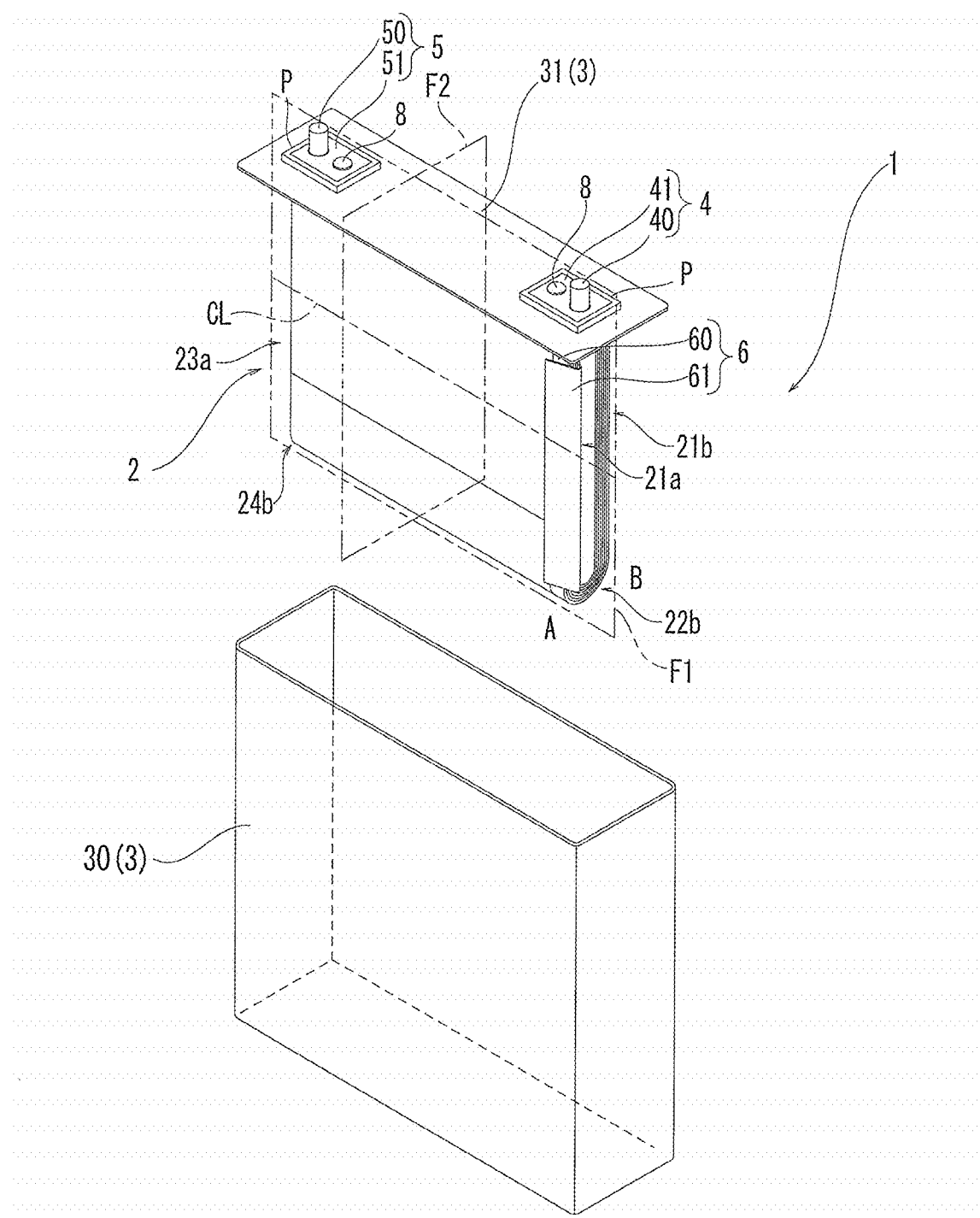
FIG. 2 illustrates a partially exploded perspective view of the battery cell according to the embodiment.
Figure 3:
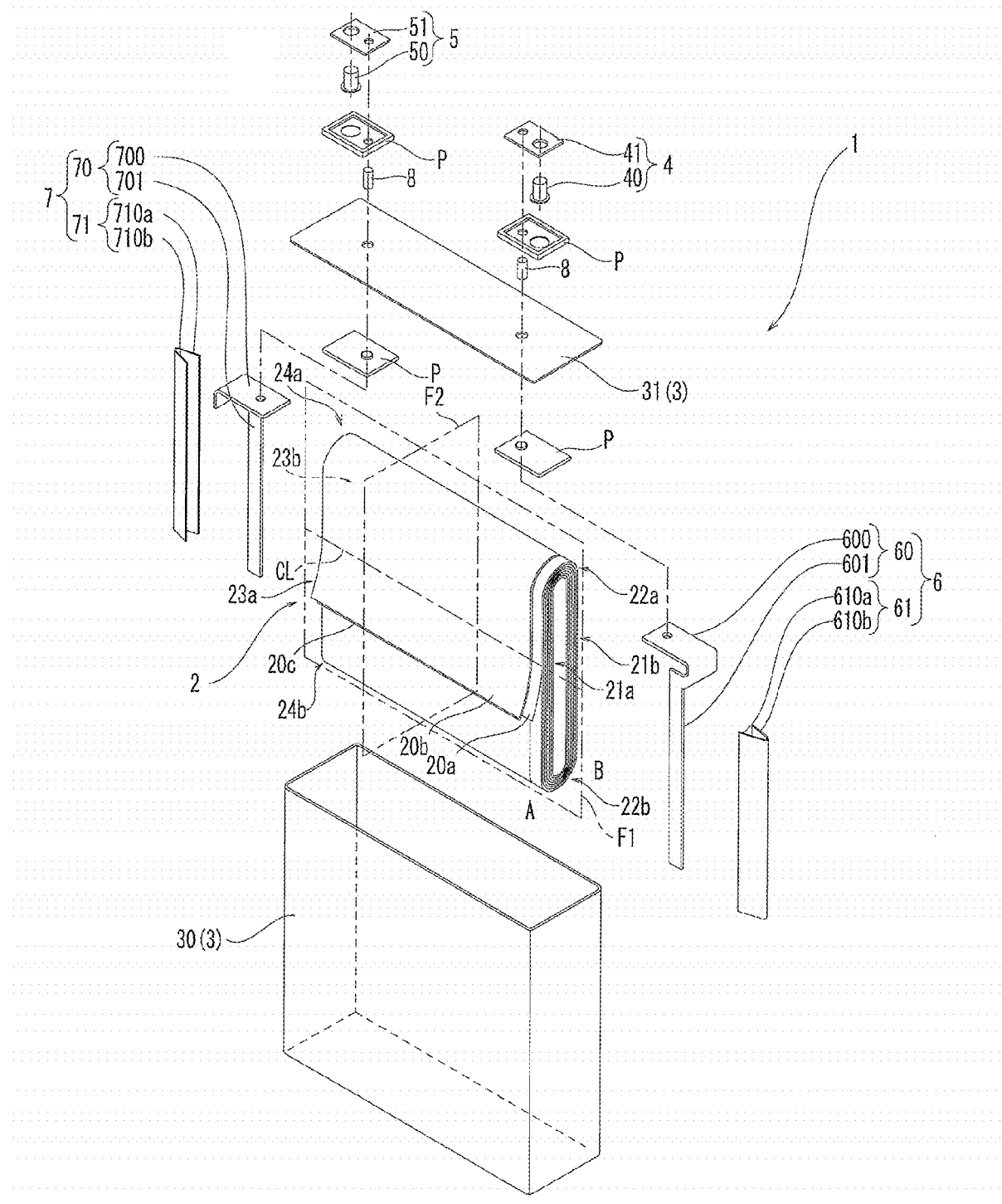
FIG. 3 illustrates an exploded perspective view of the battery cell according to the embodiment.

By way of more specific description, a battery cell 1 according to the present embodiment is provided with the electrode assembly 2 formed by flatly winding a band-shaped positive electrode 20a and a band-shaped negative electrode 20b stacked with a band-shaped separator 20c therebetween, a cell case 3 in which the electrode assembly 2 is housed, a positive-electrode external terminal structure 4 arranged outside the cell case 3, a negative-electrode external terminal structure 5 arranged outside the cell case 3, a first current collector 6 electrically connected to one end portion of the electrode assembly 2 in a width direction thereof and also electrically connected to the positive-electrode external terminal structure 4, and a second current collector 7 electrically connected to the other end portion of the electrode assembly 2 in the width direction thereof and also electrically connected to the negative-electrode external terminal structure 5, as illustrated in FIGS. 2 and 3.

The electrode assembly 2 is such that, as described above, the band-shaped positive electrode 20a and the band-shaped negative electrode 20b stacked with the band-shaped separator 20c therebetween are wound and, as illustrated in FIG. 3, the band-shaped positive electrode 20a and the band-shaped negative electrode 20b are disposed with a predetermined amount of displacement from each other in the width direction orthogonal to the longitudinal direction. Accordingly, a layer stack composed only of the band-shaped positive electrode 20a is formed at one end portion of the electrode assembly 2 in the width direction thereof (a direction corresponding to the width direction in which the band-shaped positive electrode 20a and the band-shaped negative electrode 20b are orthogonal to the longitudinal direction), and a layer stack composed only of the band-shaped negative electrode 20b is formed at the other end portion of the electrode assembly 2 in the width direction thereof (a direction corresponding to the width direction in which the band-shaped positive electrode 20a and the band-shaped negative electrode 20b are orthogonal to the longitudinal direction).

As described above, the electrode assembly 2 according to the present embodiment is formed flatly. Accordingly, in the layer stack composed only of the band-shaped positive electrode 20a and located on one end side of the electrode assembly 2 in the width direction thereof, there is formed a pair of positive-electrode layer stack sections 21a and 21b extending in a cross-sectionally long axis direction of the electrode assembly 2 in two regions A and B bounded by a first virtual plane F1 passing through the winding center CL of the electrode assembly 2 and spreading in the long axis direction thereof. In addition, the electrode assembly 2 is such that the band-shaped positive electrode 20a and the band-shaped negative electrode 20b are stacked with the separator 20c therebetween and wound flatly. Accordingly, in the layer stack composed only of the band-shaped positive electrode 20a and located on one end side of the electrode assembly 2 in the width direction thereof, there is formed a pair of circular arc-shaped positive-electrode layer stack sections 22a and 22b in which the paired positive-electrode layer stack sections 21a and 21b are connected to each other at both end portions of the electrode assembly 2 in the long axis direction thereof. That is, the electrode assembly 2 is formed so that the shape thereof as viewed from the winding center CL direction is flat. In addition, one end portion (layer stack composed only of the band-shaped positive electrode 20a) of the electrode assembly 2 in the width direction thereof forms the pair of positive-electrode layer stack sections 21a and 21b extending in the long axis direction and oriented parallel to each other in the short axis direction and the pair of circular arc-shaped positive-electrode layer stack sections 22a and 22b at which both of these end portions are connected to each other.

As described above, the electrode assembly 2 according to the present embodiment is formed flatly. Accordingly, in the layer stack composed only of the band-shaped negative electrode 20b and located on the other end side of the electrode assembly 2 in the width direction thereof, there is formed a pair of negative-electrode layer stack sections 23a and 23b extending in the long axis direction in the two regions A and B bounded by the first virtual plane F1 (see FIG. 4(d)). In addition, the electrode assembly 2 is such that the band-shaped positive electrode 20a and the band-shaped negative electrode 20b are stacked with the separator 20c therebetween and wound flatly. Accordingly, in the layer stack composed only of the band-shaped negative electrode 20b and located on the other end side of the electrode assembly 2 in the width direction thereof, there is formed a pair of circular arc-shaped negative-electrode layer stack sections 24a and 24b in which the paired negative-electrode layer stack sections 23a and 23b are connected to each other at both end portions of the electrode assembly 2 in the long axis direction thereof. That is, the electrode assembly 2 is formed so that the shape thereof as viewed from the winding center CL direction is flat. In addition, the other end portion (layer stack composed only of the band-shaped negative electrode 20b) of the electrode assembly 2 in the width direction thereof forms the pair of negative-electrode layer stack sections 23a and 23b extending in the long axis direction and oriented parallel to each other in the short axis direction and the pair of circular arc-shaped negative-electrode layer stack sections 24a and 24b at which both of these end portions are connected to each other.

The battery cell 1 is configured so as to be installable with the winding center CL of the electrode assembly 2 extending in a lateral direction (horizontal or substantially horizontal direction) thereof. The battery cell according to the present embodiment is configured to be installable in the manner that the long axis direction of the electrode assembly 2 is oriented vertically. Consequently, the electrode assembly 2 according to the present embodiment is housed in the cell case 3 (case body 30 to be described later) with the long axis direction (cross-sectionally long axis direction) as viewed from the winding center CL direction being oriented vertically. That is, the electrode assembly 2 is housed in the cell case 3, so that the pair of circular arc-shaped negative-electrode layer stack sections 24a and 24b and the pair of circular arc-shaped positive-electrode layer stack sections 22a and 22b are positioned in a vertical direction.

The cell case 3 is provided with a case body 30 one surface of which is opened and which is formed of a rectangular box shape, and a cover plate 31 for closing the open portion of the case body 30. In addition to housing the electrode assembly 2 as described above, the cell case 3 also houses a first current collector 6 and a second current collector 7, and an electrolytic solution is filled in the cell case 3.

The positive-electrode external terminal structure 4 and the negative-electrode external terminal structure 5 are disposed symmetrically to each other outside the cell case 3 (cover plate 31). The positive-electrode external terminal structure 4 and the negative-electrode external terminal structure 5 are common in structure and provided with external terminals 40 and 50 for electrically connecting and fixing a connection object (not illustrated), such as a cable or a bus bar, and connecting fittings 41 and 51 arranged on an outer surface of the cell case 3 (cover plate 31) and made of a reed-shaped metal plate. The external terminals 40 and 50 are composed of male-threaded members and outwardly inserted through one end sides of the connecting fittings 41 and 51 in the longitudinal direction thereof. The other end sides of the connecting fittings 41 and 51 in the longitudinal direction thereof are fixed to the cover plate 31 by connecting means 8 (for example, rivets 8 inserted through the cover plate 31).

The battery cell 1 according to the present embodiment is such that the first current collector 6 and the second current collector 7 are arranged symmetrically to each other inside the cell case 3 (case body 30).

The first current collector 6 is provided with a current collector body 60 including a base 600 fixed to the cover plate 31 and an electrode assembly attachment portion 601 provided in continuity with one end of the base 600 and arranged along one end portion (positive-electrode layer stack section 21a) of the electrode assembly 2 in the width direction thereof, and a clip member 61 for coupling the electrode assembly attachment portion 601 with one end portion (positive-electrode layer stack section 21a) of the electrode assembly 2.

The current collector body 60 of the first current collector 6 is formed by bending a metal plate, and the base 600 and the electrode assembly attachment portion 601 are formed integrally. The first current collector 6 according to the present embodiment is formed so that the electrode assembly attachment portion 601 is positioned along a substantially overall length of one positive-electrode layer stack section 21a with the base 600 placed along an inner surface of the cover plate 31 of the cell case 3. The electrode assembly attachment portion 601 of the first current collector 6 is arranged according to the connection location with the electrode assembly 2.

The clip member 61 of the first current collector 6 is formed by performing bending work on a metal plate. The number of clip members 61 are provided according to the connecting location(s) with the electrode assembly 2. Such a clip member 61 is provided with a pair of opposed pieces 610a and 610b opposed to each other with the bending ridge line of the clip member 61 as a boundary. In addition, the length of the clip member 61 in a direction in which the bending ridge lines of the pair of opposed pieces 610a and 610b extend is set substantially the same as that of the electrode assembly attachment portion 601. The clip member 61 is configured so that both opposed pieces 610a and 610b are brought close to each other, with one positive-electrode layer stack section 21a interposed between the pair of opposed pieces 610a and 610b along with the electrode assembly attachment portion 601, and then ultrasonically welded, thereby physically coupling and electrically connecting the positive-electrode layer stack section 21a and the electrode assembly attachment portion 601 with each other.

Figure 4A:
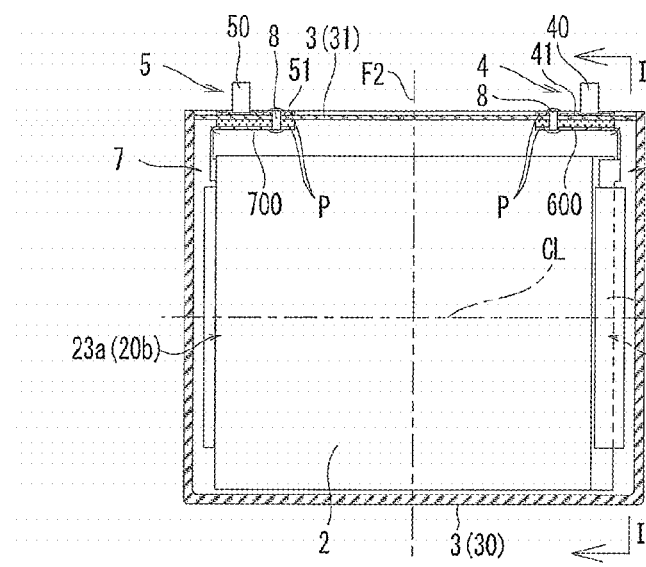
FIG. 4(a) illustrates a cross-sectional view taken from a front side of the battery cell according to the embodiment.
Figure 4B:
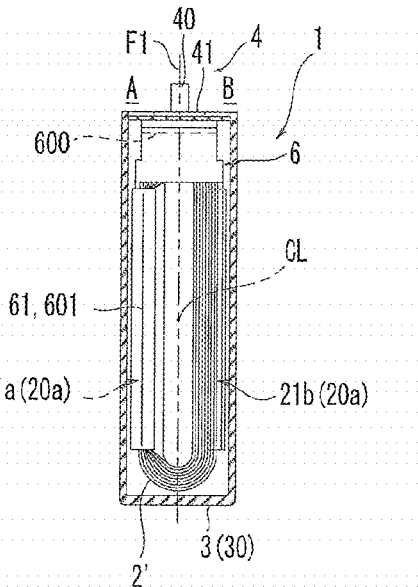
FIG. 4(b) illustrates an I-I cross-sectional view of FIG. 4(a)

As illustrated in FIGS. 4(a) and 4(b), the first current collector 6 (current collector body 60) configured as described above is such that the base 600 is fixed to the cover plate 31 and electrically connected to the connecting fitting 41 of the positive-electrode external terminal structure 4 by the connecting means 8. In the battery cell 1 according to the present embodiment, a rivet is adopted for the connecting means 8. The first current collector 6 and the connecting fitting 41 are fixed to the cover plate 31 and electrically connected to each other by caulking a rivet 8 inserted through the base 600 of the first current collector 6, the cover plate 31, and the connecting fitting 41. Note that in the battery cell 1 according to the present embodiment, the cell case 3 is formed of a conductive metal material. Accordingly, insulating gaskets P having electrical insulating properties are respectively interposed between the first current collector 6 (base 600) and the cover plate 31, between the connecting fitting 41 and the cover plate 31, and between the rivet 8 and the cover plate 31.

Referring back to FIG. 3, the second current collector 7 is provided with a current collector body 70 including a base 700 fixed to the cover plate 31 and an electrode assembly attachment portion 701 provided in continuity with the other end of the base 700 and arranged along the other end portion (negative-electrode layer stack section 23b) of the electrode assembly 2 in the width direction thereof, and a clip member 71 for coupling the electrode assembly attachment portion 701 with the other end portion (negative-electrode layer stack section 23b) of the electrode assembly 2.

The current collector body 70 of the second current collector 7 is formed by bending a metal plate, and the base 700 and the electrode assembly attachment portion 701 are formed integrally. The second current collector 7 according to the present embodiment is formed so that the electrode assembly attachment portion 701 is positioned along a substantially overall length of the other negative-electrode layer stack section 23b with the base 700 placed along an inner surface of the cover plate 31 of the cell case 3. The electrode assembly attachment portion 701 of the second current collector 7 is arranged according to the connecting location with the electrode assembly 2.

The clip member 71 of the second current collector 7 is formed by performing bending work on a metal plate. The number of clip members 71 are provided according to the connecting location(s) with the electrode assembly 2. The clip member 71 is formed by performing bending work on a metal plate and provided with a pair of opposed pieces 710a and 710b opposed to each other with the bending ridge line of the clip member 71 as a boundary. In addition, the length of the clip member 71 in a direction in which the bending ridge lines of the pair of opposed pieces 710a and 710b extend is set substantially the same as that of the electrode assembly attachment portion 701. The clip member 71 is configured so that both opposed pieces 710a and 710b are brought close to each other, with one negative-electrode layer stack section 23a interposed between the pair of opposed pieces 710a and 710b along with the electrode assembly attachment portion 701, and then ultrasonically welded, thereby physically coupling and electrically connecting the negative-electrode layer stack section 23a and the electrode assembly attachment portion 701 with each other.

Figure 4C:
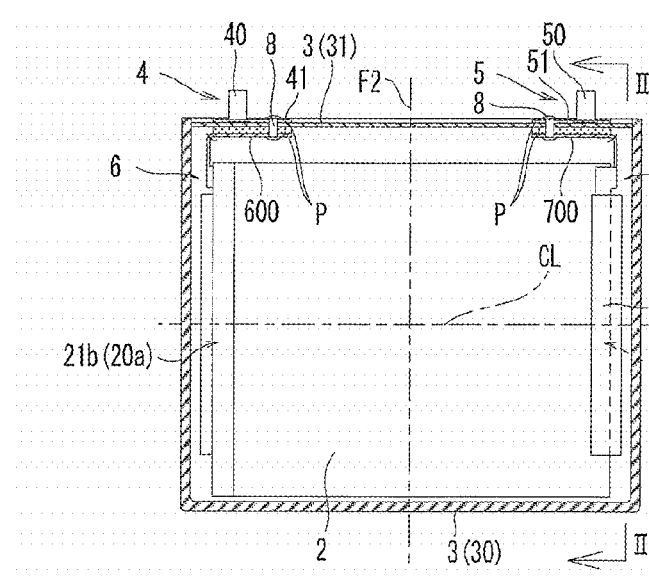
FIG. 4(c) illustrates a cross-sectional view taken from a back side of the battery cell according to the embodiment.
Figure 4D:
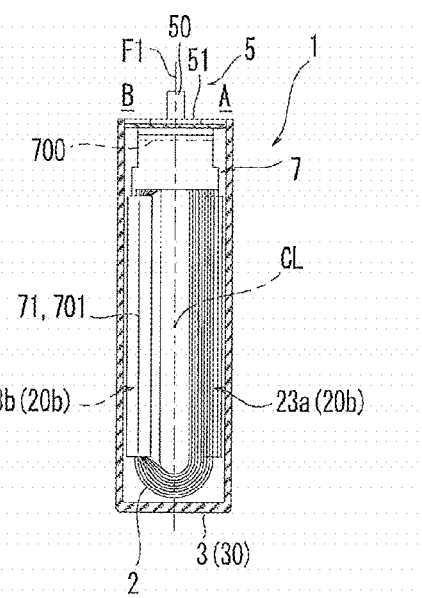
FIG. 4(d) illustrates an II-II cross-sectional view of FIG. 4(c).

As illustrated in FIGS. 4(c) and 4(d), the second current collector 7 (current collector body 70) configured as described above is such that the base 700 is fixed to the cover plate 31 and electrically connected to the connecting fitting 51 of the negative-electrode external terminal structure 5 by the connecting means 8. In the battery cell 1 according to the present embodiment, a rivet is adopted for the connecting means 8. The second current collector 7 and the connecting fitting 51 are fixed to the cover plate 31 and electrically connected to each other by caulking a rivet 8 inserted through the base 700 of the second current collector 7, the cover plate 31, and the connecting fitting 51. Note that in the battery cell 1 according to the present embodiment, the cell case 3 is formed of a conductive metal material as described above. Accordingly, insulating gaskets P having electrical insulating properties are respectively interposed between the second current collector 7 (base 700) and the cover plate 31, between the connecting fitting 51 and the cover plate 31, and between the rivet 8 and the cover plate 31.

In addition, in the battery cell 1 according to the present embodiment, a connecting location between the first current collector 6 and the positive-electrode layer stack section 21a (band-shaped positive electrode 20a) and a connecting location between the second current collector 7 and the negative-electrode layer stack section 23b (band-shaped negative electrode 20b) are set so as to be asymmetrical to each other with respect to a second virtual plane F2 passing through a center of the electrode assembly 2 in the width direction thereof and being orthogonal to the first virtual plane F1. Specifically, the battery cell 1 according to the present embodiment is such that, as illustrated in FIGS. 4(a) to 4(d), the electrode assembly attachment portion 601 of the first current collector 6 is connected to one positive-electrode layer stack section 21a located in one region A of the two regions A and B with respect to the first virtual plane F1, and the electrode assembly attachment portion 701 of the second current collector 7 is connected to the other negative-electrode layer stack section 23b located in the other region B (region B on the opposite side of the region A in which one positive-electrode layer stack section 21a is located) of the two regions A and B with respect to the first virtual plane F1.

Consequently, in the battery cell 1 according to the present embodiment, at least a layer stack composed only of the band-shaped negative electrode 20b and located in a position symmetrical to the connecting location between the first current collector 6 and the positive-electrode layer stack section 21a with respect to the second virtual plane F2 is held in an open state. Likewise, at least a layer stack composed only of the band-shaped positive electrode 20a and located in a position symmetrical to the connecting location between the second current collector 7 and the negative-electrode layer stack section 23b with respect to the second virtual plane F2 is held in an open state.

That is, the battery cell 1 according to the present embodiment is such that the electrode assembly attachment portion 601 of the first current collector 6 is connected to the whole of one positive-electrode layer stack section 21a located in one region A of the two regions A and B with respect to the first virtual plane F1, and the electrode assembly attachment portion 701 of the second current collector 7 is connected to the whole of the other negative-electrode layer stack section 23b located in the other region B (region B on the opposite side of the region A in which one positive-electrode layer stack section 21a is located) of the two regions A and B with respect to the first virtual plane F1. Consequently, a layer stack in a position symmetrical to the connecting location between the second current collector 7 and the negative-electrode layer stack section 23b with respect to the second virtual plane F2 and other than the connecting location between the first current collector 6 and the positive-electrode layer stack section 21a is held in an open state (a state in which there are formed miniscule gaps through which a fluid can flow among the band-shaped positive electrode 20a, the separator 20c, and the band-shaped negative electrode 20b) on one end side of the electrode assembly 2 in the width direction thereof.

In addition, the battery cell 1 according to the present embodiment is such that the electrode assembly attachment portion 701 of the second current collector 7 is connected to the whole of the other negative-electrode layer stack section 23b located in the other region B of the two regions A and B with respect to the first virtual plane F1, and the electrode assembly attachment portion 601 of the first current collector 6 is connected to the whole of one positive-electrode layer stack section 21a located in one region A (region A on the opposite side of the region B in which the other negative-electrode layer stack section 23b is located) of the two regions A and B with respect to the first virtual plane F1. Consequently, a layer stack in a position symmetrical to the connecting location between the first current collector 6 and the positive-electrode layer stack section 21a with respect to the second virtual plane F2 and other than the connecting location between the second current collector 7 and the negative-electrode layer stack section 23b is held in an open state (a state in which there are formed miniscule gaps through which a fluid can flow among the band-shaped negative electrode 20b, the separator 20c, and the band-shaped negative electrode 20b) on the other end side of the electrode assembly 2 in the width direction thereof.

The battery cell 1 according to the present embodiment is configured as described above, so that electricity from the band-shaped positive electrode 20a of the electrode assembly 2 is conducted through the first current collector 6 and the connecting means (rivet) 8 to the positive-electrode external terminal structure 4 (external terminal 40) and that electricity from the band-shaped negative electrode 20b of the electrode assembly 2 is conducted through the second current collector 7 and the connecting means (rivet) 8 to the negative-electrode external terminal structure 5 (external terminal 50). In addition, in the battery cell 1 configured as described above, both of the positive-electrode external terminal structure 4 and the negative-electrode external terminal structure 5 employ male-threaded members for the external terminals 40 and 50. Accordingly, when a connection object, such as a cable or a bus bar, is connected, the external terminals 40 and 50 are inserted through the connection object, and then nuts (not illustrated) are threadably mounted on the leading-end sides of the external terminals 40 and 50 protruding from the connection object. This places the connection object in a state of being sandwiched by the nuts and the connecting fittings 41 and 51 and fixed and electrically connected to the positive-electrode external terminal structure 4 or the negative-electrode external terminal structure 5.

As described above, in the battery cell 1 according to the present embodiment, at least a layer stack composed only of the band-shaped negative electrode 20b (one negative-electrode layer stack section 23a) and located in a position symmetrical to the connecting location between the first current collector 6 and the positive-electrode layer stack section 21a with respect to the second virtual plane F2 is held in an open state. Likewise, at least a layer stack composed only of the band-shaped positive electrode 20a (the other positive-electrode layer stack section 21b) and located in a position symmetrical to the connecting location between the second current collector 7 and the negative-electrode layer stack section 23b with respect to the second virtual plane F2 is held in an open state. Consequently, the battery cell 1 configured as described above makes it easy for an electrolytic solution filled in the cell case 3 to flow from open parts (the other positive-electrode layer stack section 21a and one negative-electrode layer stack section 23b) located on both sides of the electrode assembly 2 in the width direction thereof into the electrode assembly 2 (into between the band-shaped positive electrode 20a, the separator 20c, and the band-shaped negative electrode 20b), and fill the inside of the electrode assembly 2.

In addition, the battery cell 1 according to the present embodiment is such that, as described above, at least a layer stack composed only of the band-shaped negative electrode 20b (one negative-electrode layer stack section 23a) and located in a position symmetrical to the connecting location between the first current collector 6 and the positive-electrode layer stack section 21a with respect to the second virtual plane F2 is held in an open state. Likewise, at least a layer stack composed only of the band-shaped positive electrode 20a (the other positive-electrode layer stack section 21b) and located in a position symmetrical to the connecting location between the second current collector 7 and the negative-electrode layer stack section 23b with respect to the second virtual plane F2 is held in an open state. Accordingly, even if gases are generated within the electrode assembly 2 due to electrical charge, the gases within the electrode assembly 2 are exhausted from the open-state end portions (the other positive-electrode layer stack section 21b and one negative-electrode layer stack section 23a).

Consequently, the battery cell 1 according to the present embodiment can efficiently fill the electrode assembly 2 with the electrolytic solution and efficiently exhaust the gases within the electrode assembly 2. Thus, the battery cell 1 can ensure stable output power.

In particular, the battery cell 1 according to the present embodiment is such that the first current collector 6 is connected to the whole of one positive-electrode layer stack section 21a located in one region A of the two regions A and B, and the second current collector 7 is connected to the whole of the other negative-electrode layer stack section 23b located in the other region B on the opposite side of the region A of the two regions A and B. Consequently, in each of the first current collector 6 and the second current collector 7, it is possible to secure areas of connection (contact areas) necessary for electrical connection with the electrode assembly 2, and form open parts on both sides of the electrode assembly 2 in the width direction thereof. That is, adopting the above-described configuration causes the other positive-electrode layer stack section 21b of the pair of positive-electrode layer stack sections 21a and 21b at one end portion of the electrode assembly 2 to come into an open state and one negative-electrode layer stack section 23a of the pair of negative-electrode layer stack sections 23a and 23b at the other end portion of the electrode assembly 2 to also come into an open state. Consequently, the battery cell 1 can efficiently perform infiltration of the electrolytic solution into the electrode assembly 2 and exhaust of the gases generated within the electrode assembly 2 during electrical charge, while sufficiently ensuring electrical connection between the electrode assembly 2 and the current collectors 6 and 7.

In addition, the battery cell 1 according to the present embodiment is configured to be installable with the winding center CL of the electrode assembly 2 extending laterally. Thus, the height of the positive-electrode layer stack sections 21a and 21b located at one end portion of the electrode assembly 2 in a direction in which the winding center CL of the electrode assembly 2 extends and the height of the negative-electrode layer stack sections 23a and 23b located at the other end portion of the electrode assembly 2 in the direction in which the winding center CL extends are at the same or substantially the same level, with the battery cell 1 installed in a predetermined position. Consequently, in the battery cell 1 configured as described above, an electrolytic solution efficiently infiltrates from both ends of the winding center CL of the electrode assembly 2, and gases generated due to electrical charge and discharge are efficiently exhausted from both ends of the winding center CL of the electrode assembly 2, with the battery cell installed in a predetermined position.

Note that the present invention is not limited to the above-described embodiments, and it is needless to say that the embodiments can be modified as appropriate, without departing from the gist of the invention.

For example, in the above-described embodiments, the first current collector 6 is connected to the whole of one of the pair of positive-electrode layer stack sections 21a and 21b extending in the cross-sectionally long axis direction of the electrode assembly 2 in the two regions A and B of the layer stack composed only of the band-shaped positive electrode 20a bounded by the first virtual plane F1 passing through the winding center CL of the electrode assembly 2 and spreading in the cross-sectionally long axis direction, and the second current collector 7 is connected to the whole of the other one of the pair of negative-electrode layer stack sections 23a and 23b extending in the long axis direction in the two regions A and B of the layer stack composed only of the band-shaped negative electrode 20b. The present invention is not limited to these embodiments, however.

That is, for example, the first current collector 6 may be connected to the whole of the other one of the pair of positive-electrode layer stack sections 21a and 21b extending in the long axis direction in the two regions A and B bounded by the first virtual plane F1, and the second current collector 7 may be connected to the whole of one of the pair of negative-electrode layer stack sections 23a and 23b extending in the long axis direction in the two regions A and B, on the premise that the connecting location between the first current collector 6 and the positive-electrode layer stack sections 21a and 21b and the connecting location between the second current collector 7 and the negative-electrode layer stack sections 23a and 23b are asymmetrical to each other with respect to the second virtual plane F2 passing through the center of the electrode assembly 2 in the width direction thereof and being orthogonal to the first virtual plane F1.

Alternatively, as illustrated in FIGS. 5(a) to 5(f), the first current collector 6 may be connected to part of one of the pair of positive-electrode layer stack sections 21a and 21b of the layer stack composed only of the band-shaped positive electrode 20a, the pair of positive-electrode layer stack sections 21a and 21b extending in the long axis direction of the electrode assembly 2 in the two regions A and B bounded by the first virtual plane F1 passing through the winding center CL of the electrode assembly 2 and extending in the cross-sectionally long axis direction, and the second current collector 7 may be connected to part of one of the pair of negative-electrode layer stack sections 23a and 23b of the layer stack composed only of the band-shaped negative electrode 20a, the pair of negative-electrode layer stack sections 23a and 23b extending in the long axis direction in the two regions A and B bounded by the first virtual plane F1, on the premise that the connecting location between the first current collector 6 and the positive-electrode layer stack sections 21a and 21b and the connecting location between the second current collector 7 and the negative-electrode layer stack sections 23a and 23b are asymmetrical to each other with respect to the second virtual plane F2 passing through the center of the electrode assembly 2 in the width direction thereof and being orthogonal to the first virtual plane F1.

This way of configuration can produce the same action and effect as those of the above-described embodiments. That is, the battery cell 1 is such that layers of the band-shaped positive electrodes 20a and 20a of the positive-electrode layer stack sections 21a and 21b in positions other than the connecting location with the first current collector 6, including portions of the positive-electrode layer stack sections 21a and 21b (layer stack composed only of the band-shaped positive electrode 20a) located in a position symmetrical to the connecting location between the second current collector 7 and the negative-electrode layer stack sections 23a and 23b with respect to the second virtual plane F2 are held in an open state (held spaced apart from each other), and layers of the band-shaped negative electrodes 20b and 20b of the negative-electrode layer stack sections 23a and 23b in positions other than the connecting location with the second current collector 7, including portions of the negative-electrode layer stack sections 23a and 23b (layer stack composed only of the band-shaped negative electrode 20b) located in a position symmetrical to the connecting location between the first current collector 6 and the positive-electrode layer stack sections 21a and 21b with respect to the second virtual plane F2 are also held in an open state (held spaced apart from each other).

Accordingly, the battery cell 1 configured as described above allows an electrolytic solution to efficiently infiltrate from the open-state positive-electrode layer stack sections 21a and 21b (from between layers of the band-shaped positive electrodes 20a and 20a) and negative-electrode layer stack sections 23a and 23b (from between layers of the band-shaped negative electrodes 20b and 20b) into the electrode assembly 2. In addition, gases generated within the electrode assembly 2 due to electrical charge can be efficiently exhausted from the open-state positive-electrode layer stack sections 21a and 21b (from between layers of the band-shaped positive electrodes 20a and 20a) and negative-electrode layer stack sections 23a and 23b (from between layers of the band-shaped negative electrodes 20b and 20b).

In this type of battery cell, the electrode assembly (band-shaped positive and negative electrodes) undergoes expansion and contraction during electrical charge and discharge. In the battery cell 1 configured as described above, the rest of the positive-electrode layer stack sections 21a and 21b (layers of the band-shaped positive electrodes 20a and 20a) in positions other the connecting location with the first current collector 6 and the rest of the negative-electrode layer stack sections 23a and 23b (layers of the band-shaped negative electrodes 20b and 20b) in positions other the connecting location with the second current collector 7 are held in an open state. Consequently, it is possible to release stress to be worked upon the electrode assembly 2 (band-shaped positive and negative electrodes 20a and 20b) due to electrical charge and discharge (expansion and contraction), and improve battery cell life. Note that FIGS. 5(a) and 5(b), FIGS. 5(c) and 5(d), and FIGS. 5(e) and 5(f) respectively illustrate cross sections of one and the other end sides of an electrode assembly of the same battery cell.

Note that the term "part" as used herein means that a location to which the first current collector 6 or the second current collector 7 is connected is partial. "Part" is a concept including, for example, the notion that a part of a single positive-electrode layer stack section 21a or 21b or negative-electrode layer stack section 23a or 23b to which the first current collector 6 or the second current collector 7 is connected is longer than parts excluded from connection in the long axis direction and that a part of a single positive-electrode layer stack section 21a or 21b or negative-electrode layer stack section 23a or 23b to which the first current collector 6 or the second current collector 7 is connected is shorter than parts excluded from connection in the long axis direction. In other words, "part" means that a part to which the first current collector 6 or the second current collector 7 is connected is not the whole of the positive-electrode layer stack section 21a or 21b or the negative-electrode layer stack section 23a or 23b.

By way of describing a specific example here, the first current collector 6 may be connected to the upper or lower portion (the upper portion in the case of FIGS. 5(a) and 5(c)) of the positive-electrode layer stack section 21a located in one region A of the two regions A and B of the electrode assembly 2, as illustrated in FIGS. 5(a) to 5(d), in a case where the battery cell 1 is configured to be installable with the long axis direction of the electrode assembly 2 being oriented vertically. Likewise, the second current collector 7 may be connected to the upper or lower portion (the upper portion in the case of FIG. 5(a) and the lower portion in the case of FIG. 5(c)) of the negative-electrode layer stack section 23b located in the other region B on the opposite side of the region A of the two regions A and B of the electrode assembly 2. Note that, here, "upper portion" refers to a portion within a half area upper than the winding center CL of the electrode assembly 2, and "lower portion" refers to a portion within a half area lower than the winding center CL of the electrode assembly 2.

This way of configuration brings all the layers of the band-shaped negative electrodes 20b and 20b of the negative-electrode layer stack section 23a located in the same region A as the positive-electrode layer stack section 21a to which the first current collector 6 is connected into an open state, and all the layers of the band-shaped positive electrodes 20a and 20a of the positive-electrode layer stack section 21b located in the same region B as the negative-electrode layer stack section 23b to which the second current collector 7 is connected also into an open state.

Accordingly, the battery cell 1 configured as described above allows an electrolytic solution to efficiently infiltrate from the open-state positive-electrode layer stack section 21b (from between layers of the band-shaped positive electrodes 20a and 20a) and negative-electrode layer stack section 23a (from between layers of the band-shaped negative electrodes 20b and 20b) into the electrode assembly 2. In addition, gases generated within the electrode assembly 2 due to electrical charge can be efficiently exhausted from the open-state positive-electrode layer stack section 21b (from between layers of the band-shaped positive electrodes 20a and 20a) and negative-electrode layer stack section 23a (from between layers of the band-shaped negative electrodes 20b and 20b). In particular, in the battery cell 1 configured as described above, the region A in which the first current collector 6 is connected and the region B in which the second current collector 7 is connected differ from each other. Consequently, the battery cell 1 makes it easy for the electrolytic solution to circulate in the electrode assembly 2, and facilitates exhaust of gases generated within the electrode assembly 2.

Alternatively, in a case where the battery cell 1 is configured to be installable with the long axis direction of the electrode assembly 2 being oriented vertically, the first current collector 6 may be connected to one of the upper and lower portions (the upper portion of one positive-electrode layer stack section 21a in one region A in the case of FIGS. 5(c) and 5(e)) of the positive-electrode layer stack section 21a or 21b located in the region A or B on one end side of the electrode assembly 2, as illustrated in FIGS. 5(c) to 5(f), and the second current collector 7 may be connected to the other one of the upper and lower portions (the lower portion of the other positive-electrode layer stack section 21b located in the other region B in the case of FIG. 5(d), and the lower portion of one positive-electrode layer stack section 21a located in one region A in the case of FIG. 5(f)) of the negative-electrode layer stack section 23a or 23b located in the region A or B on the other end side of the electrode assembly 2.

By this way of configuration, layers of the band-shaped positive electrodes 20a and 20a of part (the other one of the upper and lower portions) of the positive-electrode layer stack section 21a or 21b, other than the part thereof to which the first current collector 6 is connected, located in one region A or B on one end side, and layers of the band-shaped positive electrodes 20a and 20a of the positive-electrode layer stack section 21a or 21b located in the other region A or B on the one end side are held in an open state (held spaced apart from each other). Likewise, layers of the band-shaped negative electrodes 20b and 20b of part of the negative-electrode layer stack section 23a or 23b, other than the part thereof (one of the upper and lower portions) to which the second current collector 7 is connected, located in one region A or B on the other end side, and layers of the band-shaped negative electrodes 20b and 20b of the negative-electrode layer stack section 23a or 23b located in the other region A or B on the other end side are also held in an open state.

Accordingly, in the battery cell 1 configured as described above, an electrolytic solution can be efficiently made infiltrate from the open-state positive-electrode layer stack sections 21a and 21b (from between layers of the band-shaped positive electrodes 20a and 20a) and the open-state negative-electrode layer stack sections 23a and 23b (from between layers of the band-shaped negative electrodes 20b and 20b) into the electrode assembly 2. In addition, gases generated within the electrode assembly 2 due to electrical charge can be efficiently exhausted from the open-state positive-electrode layer stack sections 21a and 21b (from between layers of the band-shaped positive electrodes 20a and 20a) and the open-state negative-electrode layer stack sections 23a and 23b (from between layers of the band-shaped negative electrodes 20b and 20b).

In particular, in the battery cell 1 configured as described above, the connecting location between the electrode assembly 2 and the first current collector 6 and the connecting location between the electrode assembly 2 and the second current collector 7 differ in the vertical direction. Accordingly, the location of open parts of the positive-electrode layer stack sections 21a and 21b to which the first current collector 6 is connected and the location of open parts of the negative-electrode layer stack sections 23a and 23b to which the second current collector 7 is connected differ in the vertical direction. Consequently, the battery cell 1 configured as described above makes it easy for the electrolytic solution to circulate in the electrode assembly 2, and facilitates exhaust of gases generated within the electrode assembly 2.

Alternatively, as illustrated in FIGS. 6(a) to 6(d), the first current collector 6 may be connected to part of each of both of the pair of positive-electrode layer stack sections 21a and 21b, among layer stack composed only of the band-shaped positive electrode 20a, the pair of positive-electrode layer stack sections 21a and 21b extending in the long axis direction of the electrode assembly 2 in the two regions A and B bounded by the first virtual plane F1 passing through the winding center CL of the electrode assembly 2 and spreading in the cross-sectionally long axis direction, on the premise that the connecting location between the first current collector 6 and the positive-electrode layer stack sections 21a and 21b and the connecting location between the second current collector 7 and the negative-electrode layer stack sections 23a and 23b are asymmetrical to each other with respect to the second virtual plane F2 passing through the center of the electrode assembly 2 in the width direction thereof and being orthogonal to the first virtual plane F1. In accordance with this configuration, the second current collector 7 may be connected to part of each of both of the pair of negative-electrode layer stack sections 23a and 23b, among layer stack composed only of the band-shaped negative electrode 20b, the pair of negative-electrode layer stack sections 23a and 23b extending in the long axis direction in the two regions A and B bounded by the first virtual plane F1 passing through the winding center CL of the electrode assembly 2 and spreading in the cross-sectionally long axis direction thereof. Note that FIGS. 6(a) and 6(b), and FIGS. 6(c) and 6(d) respectively illustrate cross sections of one end side and the other end side of an electrode assembly of the same battery cell.

This way of configuration also causes at least a location symmetrical to the connecting location between the first current collector 6 and the positive-electrode layer stack sections 21a and 21b (symmetrical location on the other end side of the electrode assembly 2 in the width direction thereof) and a location symmetrical to the connecting location between the second current collector 7 and the negative-electrode layer stack sections 23a and 23b with respect to the second virtual plane F2 (symmetrical location on one end side of the electrode assembly 2 in the width direction thereof) to come into an open state (a state in which the locations are not tightened together by connection with the first current collector 6 or the second current collector 7). Thus, it is possible to achieve smooth gas exhaust during electrical charge and infiltration of an electrolytic solution. In addition, in the battery cell 1 configured as described above, the first current collector 6 is connected to one place each of the pair of positive-electrode layer stack sections 21a and 21b, and the second current collector 7 is connected to one place each of the pair of negative-electrode layer stack sections 23a and 23b. Thus, it is possible to achieve high-rate discharge performance and input-output performance improvement based on a reduction in current-collecting resistance. Yet additionally, the battery cell 1 configured as described above is such that the first current collector 6 is connected to the pair of positive-electrode layer stack sections 21a and 21b located respectively in the two regions A and B bounded by the first virtual plane F1 and the second current collector 7 is connected to the pair of negative-electrode layer stack sections 23a and 23b located respectively in the two regions A and B bounded by the first virtual plane F1. Thus, the battery cell 1 is superior in resistance to vibration in a direction orthogonal to the first virtual plane F1.

Figure 6A:
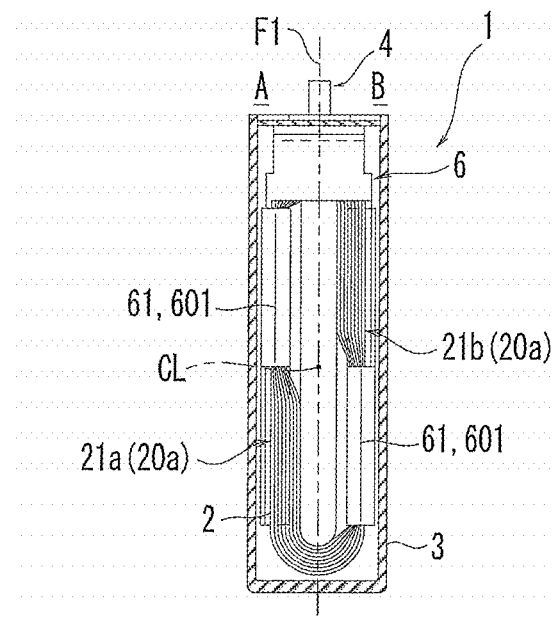
FIG. 6(a) illustrates a cross-sectional view taken from one end side of the electrode assembly of the battery cell according to the yet another embodiment in the winding center direction of the electrode assembly.
Figure 6B:
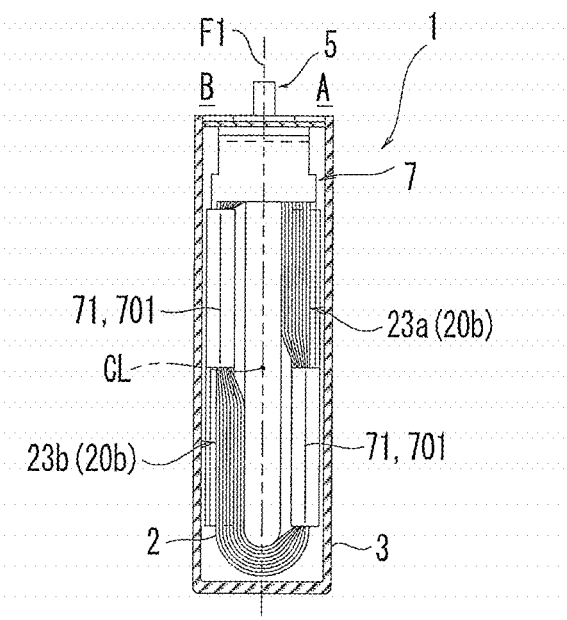
FIG. 6(b) illustrates a cross-sectional view taken from the other end side of the electrode assembly of the battery cell illustrated in FIG. 6(a) in the winding center direction of the electrode assembly.
Figure 6C:
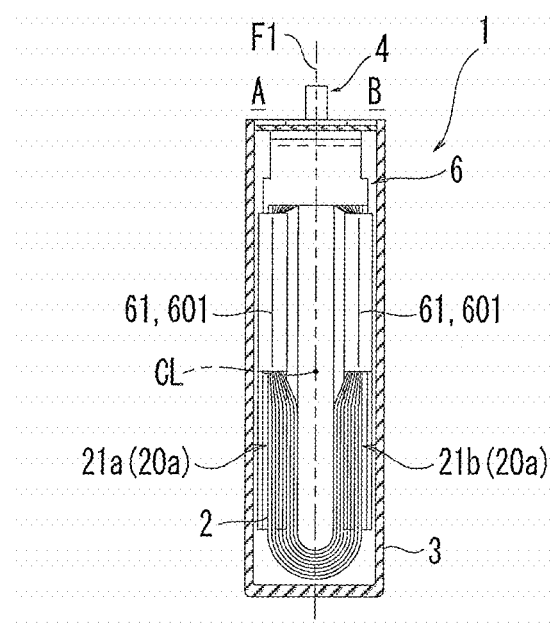
FIG. 6(c) illustrates a cross-sectional view taken from one end side of the electrode assembly of a battery cell according to still another embodiment in the winding center direction of the electrode assembly.
Figure 6D:
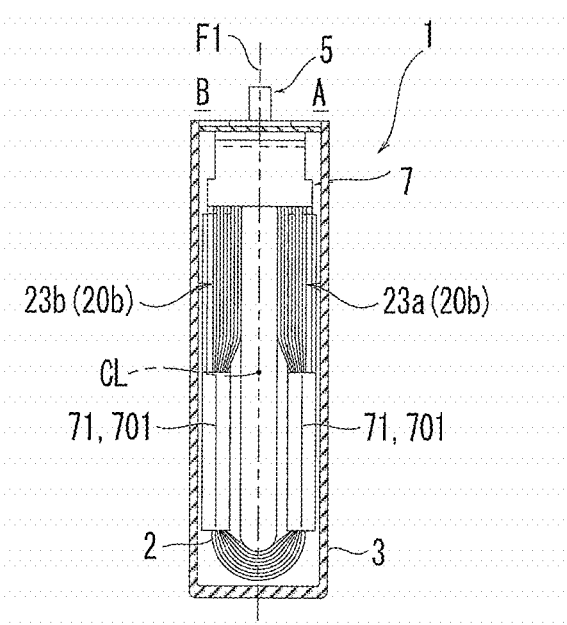
FIG. 6(d) illustrates a cross-sectional view taken from the other end side of the electrode assembly of the battery cell illustrated in FIG. 6(c) in the winding center direction of the electrode assembly.

In particular, as illustrated in FIGS. 6(c) and 6(d), the first current collector 6 is connected to one end side (one end side to be positioned on an upper side (upper portion) at the time of installation in the case of FIG. 6(c)) of each of the pair of positive-electrode layer stack sections 21a and 21b located in the two regions A and B, and the second current collector 7 is connected to the other end side (the other end side to be positioned on a lower side (lower portion) at the time of installation in the case of FIG. 6(d)) of each of the pair of negative-electrode layer stack sections 23a and 23b located in the two regions A and B. Thus, the battery cell 1 is superior in resistance to vibration in the winding center CL direction of the electrode assembly 2 and in a direction orthogonal to the first virtual plane F1.

In a case where the first current collector 6 is connected to part of both of, or part of one of, the pair of positive-electrode layer stack sections 21a and 21b, of the layer stack composed only of the band-shaped positive electrode 20a, the pair of positive-electrode layer stack sections 21a and 21b extending in the cross-sectionally long axis direction of the electrode assembly 2 in the two regions A and B bounded by the first virtual plane F1 passing through the winding center CL of the electrode assembly 2 and spreading in the long axis direction thereof, and the second current collector 7 is connected to part of both of, or part of one of, the pair of negative-electrode layer stack sections 23a and 23b, of the layer stack composed only of the band-shaped negative electrode 20b, the pair of negative-electrode layer stack sections 23a and 23b extending in the long axis direction in the two regions A and B bounded by the first virtual plane F1, the first current collector 6 is preferably connected to a side of the positive-electrode layer stack sections 21a and 21b lower than the upper portion thereof in the long axis direction, and the second current collector 7 is preferably connected to a side of the negative-electrode layer stack sections 23a and 23b lower than the upper portion thereof in the long axis direction.

By this way of configuration, gases generated during electrical charge can be exhausted efficiently. That is, in addition to the layer stack composed only of the band-shaped negative electrode 20b and located in a position symmetrical to the connecting location between the first current collector 6 and the positive-electrode layer stack section 21a with respect to the second virtual plane F2 and the layer stack composed only of the band-shaped positive electrode 20a and located in a position symmetrical to the connecting location between the second current collector 7 and the negative-electrode layer stack section 23b with respect to the second virtual plane F2, a layer stack composed only of the band-shaped positive electrode 20a and located upper than the connecting location between the first current collector 6 and the positive-electrode layer stack sections 21a and 21b and a layer stack composed only of the band-shaped negative electrode 20b and located upper than the connecting location between the second current collector 7 and the negative-electrode layer stack sections 23a and 23b are also held in an open state. Consequently, gases generated during electrical charge and moving upward within the electrode assembly 2 due to a buoyant force can be efficiently exhausted from both end portions of the electrode assembly 2.

In the above-described embodiments, one electrode assembly 2 is housed in the cell case 3. The embodiments are not limited to this configuration, however. For example, as illustrated in FIGS. 7(a) to 7(d) and FIGS. 8(a) to 8(d), two or more electrode assemblies 2 may be housed in a single cell case 3. In this case, respective electrode assemblies 2 are housed side by side in the cell case 3, so that the long axis direction of the electrode assemblies 2 are oriented in the vertical direction thereof. That is, the two or more electrode assemblies 2 are arranged side by side, so that the respective negative-electrode layer stack sections 23a and 23b and the respective positive-electrode layer stack sections 21a and 21b thereof are aligned to each other and that the first virtual planes F1 and F1 of the electrode assemblies 2 are parallel or substantially parallel to each other or one another. Note that FIGS. 7(a) and 7(b) and FIG. 7(c) and FIG. 7(d) respectively illustrate cross sections on one and the other end sides of the same battery cell. Likewise, FIGS. 8(a) and 8(b) and FIGS. 8(c) and 8(d) respectively illustrate cross sections on one and the other end sides of the same battery cell.

In this case, the first current collector 6 should be such that two or more electrode assembly attachment portions 601 and 601 corresponding to respective electrode assemblies 2 are provided in continuity with a single base 600. Likewise, the second current collector 7 should be such that two or more electrode assembly attachment portions 701 and 701 corresponding to respective electrode assemblies 2 are provided in continuity with a single base 700. In addition, in each of the electrode assemblies 2, a connecting location between the first current collector 6 (electrode assembly attachment portions 601 and 601) and the positive-electrode layer stack sections 21a and 21b and a connecting location between the second current collector 7 (electrode assembly attachment portions 701 and 701) and the negative-electrode layer stack sections 23a and 23b should be made asymmetrical to each other with respect to the second virtual plane F2 passing through the center of the electrode assembly 2 in the width direction thereof and being orthogonal to the first virtual plane F1.

That is, as illustrated in FIGS. 7(a) to 7(d), the first current collector 6 may be connected to part of one group of positive-electrode layer stack sections 21a and 21b (one group of positive-electrode layer stack sections 21a and 21a of the respective electrode assemblies 2 and 2 located in one group of regions A and A in the case of FIGS. 7(a) and 7(c)) of the respective electrode assemblies 2 and 2 located in one of the groups of two regions A, B, A and B. On the premise of such a mode of connection of the first current collector 6 with the electrode assemblies 2, the second current collector 7 may be connected to part of one group of negative-electrode layer stack sections 23a and 23b (the other group of negative-electrode layer stack sections 23b and 23b located in the other group of regions B and B of the respective electrode assemblies 2 and 2 in the case of FIG. 7(b), and one group of negative-electrode layer stack sections 23a and 23a located in one group of regions A and A of the respective electrode assemblies 2 in the case of FIG. 7(d)).

Figure 8A:
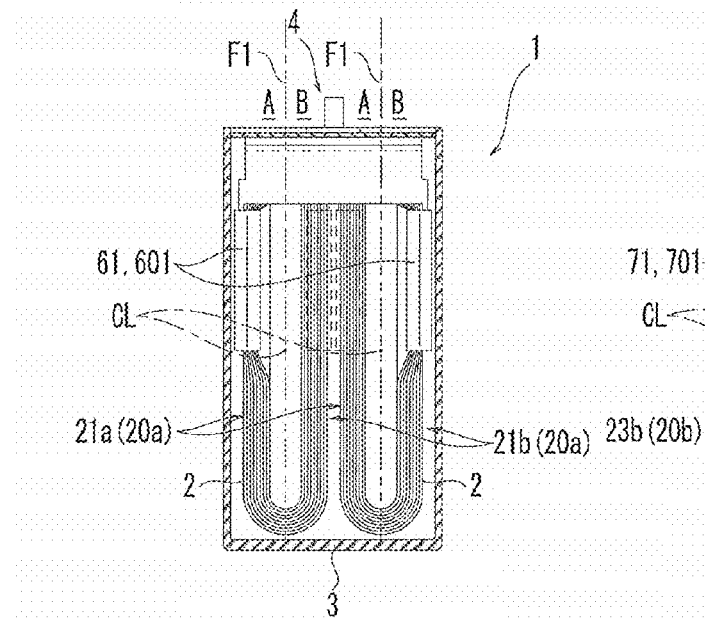
FIG. 8(a) illustrates a cross-sectional view taken from one end side of the electrode assembly of the battery cell according to the still another embodiment in the winding center direction of the electrode assembly.
Figure 8B:
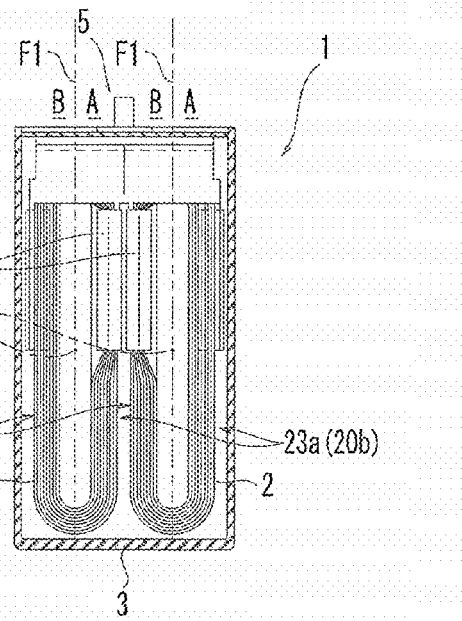
FIG. 8(b) illustrates a cross-sectional view taken from the other end side of the electrode assembly of the battery cell illustrated in FIG. 8(a) in the winding center direction of the electrode assembly.
Figure 8C:
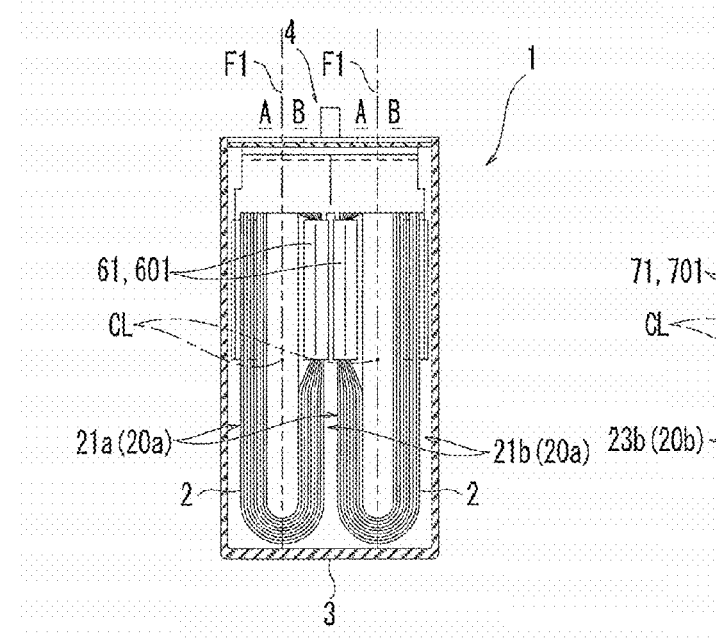
FIG. 8(c) illustrates a cross-sectional view taken from one end side of the electrode assembly of a battery cell according to still another embodiment in the winding center direction of the electrode assembly.
Figure 8D:
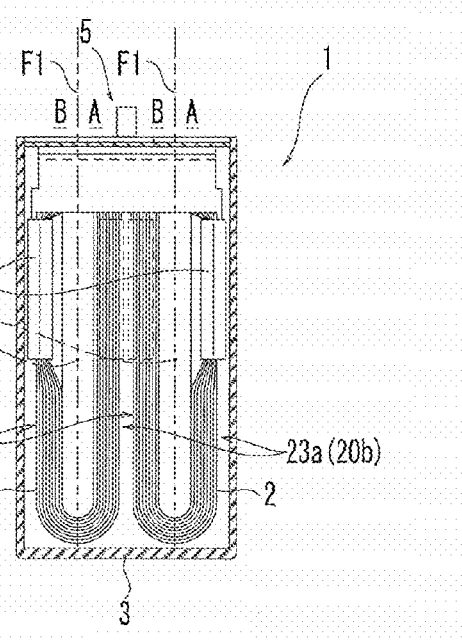
FIG. 8(d) illustrates a cross-sectional view taken from the other end side of the electrode assembly of the battery cell illustrated in FIG. 8(c) in the winding center direction of the electrode assembly.
Figure 12:
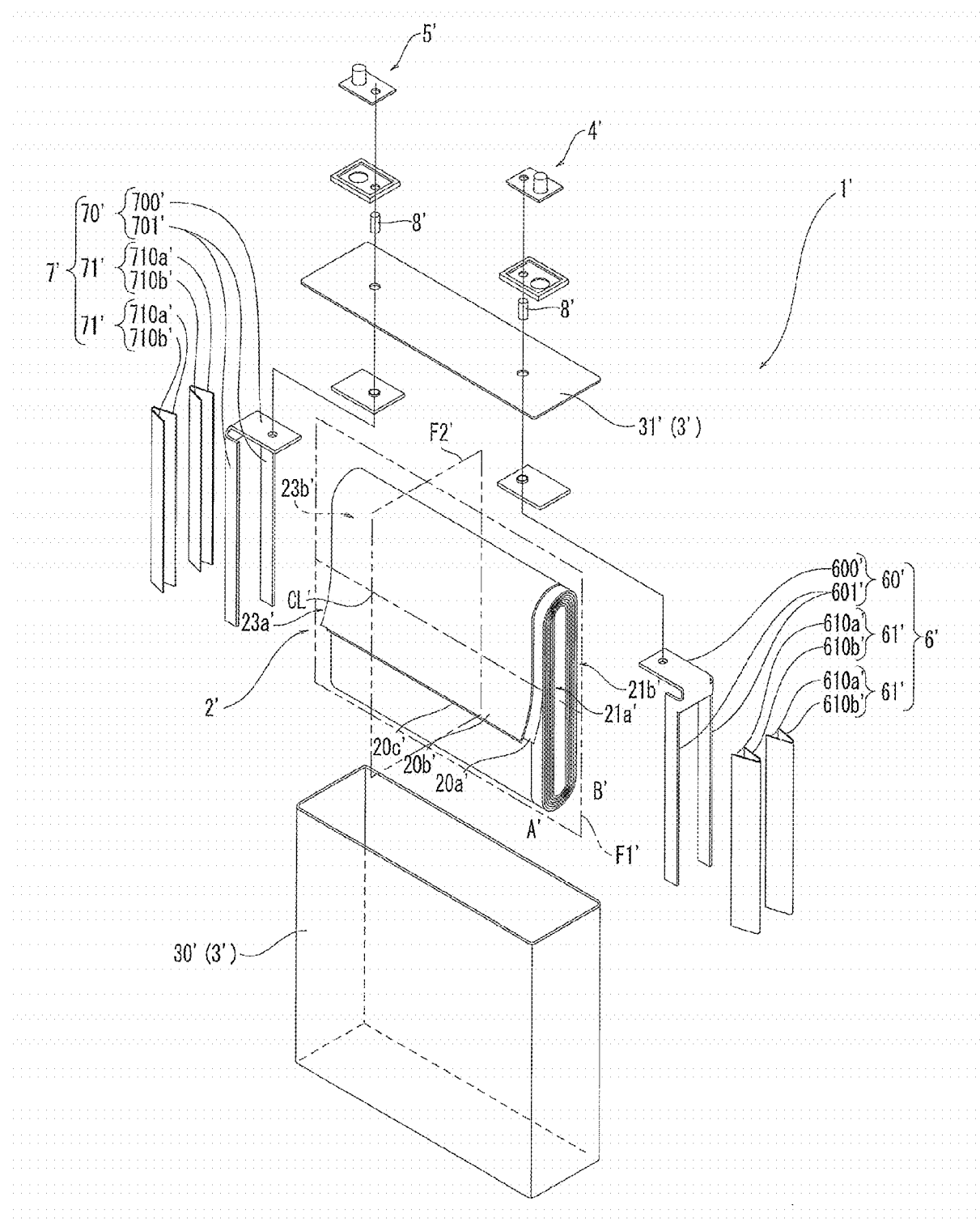
FIG. 12 illustrates an exploded perspective view of the conventional battery cell.
Figure 13A:
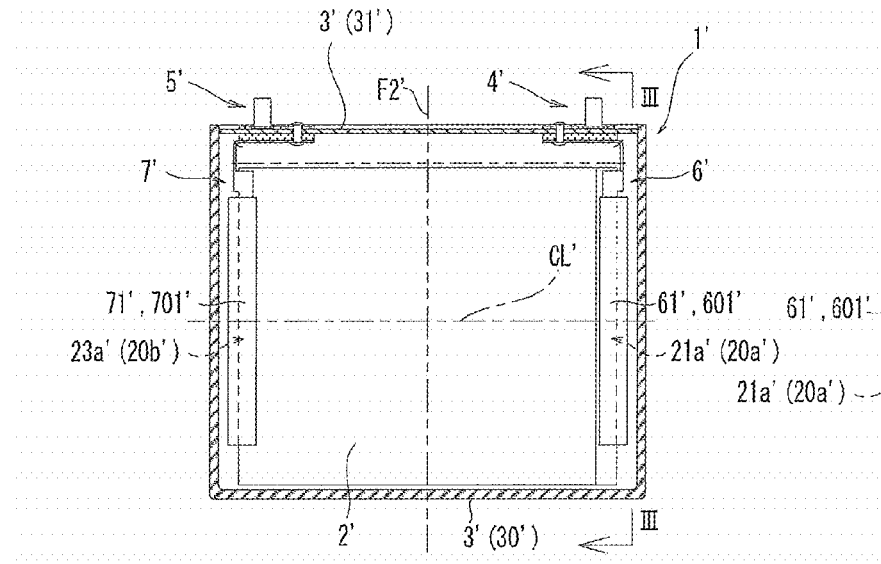
FIG. 13(a) illustrates a cross-sectional view taken from a front side of the conventional battery cell.
Figure 13B:
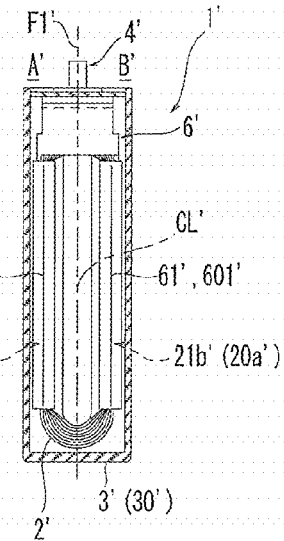
FIG. 13(b) illustrates an cross-sectional view of FIG. 13(a)
Figure 13C:
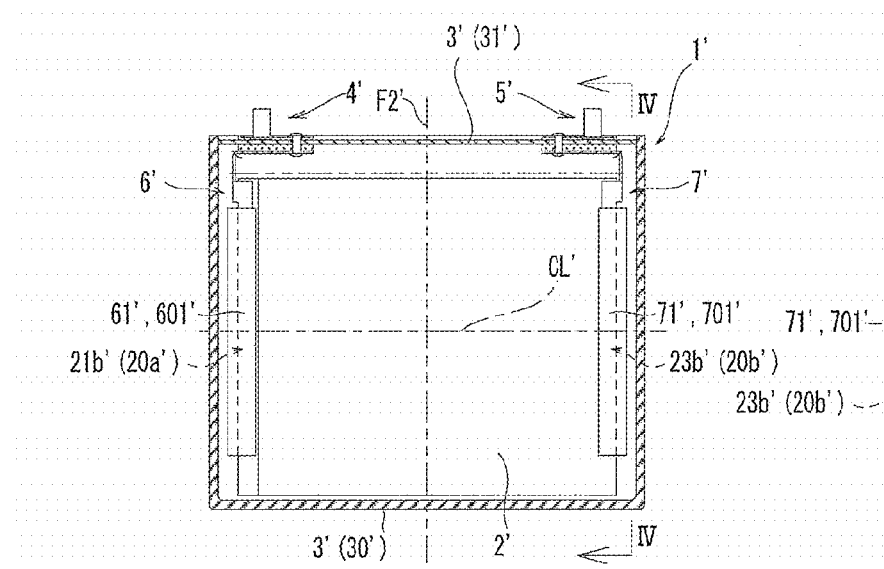
FIG. 13(c) illustrates a cross-sectional view taken from a back side of the conventional battery cell.
Figure 13D:
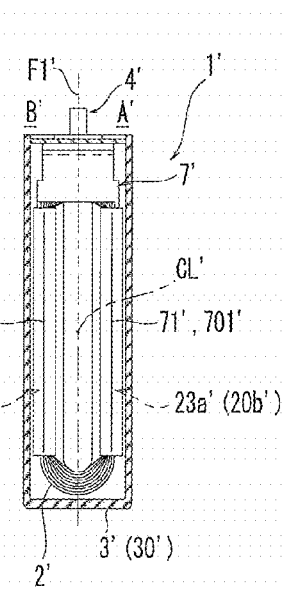
FIG. 13(d) illustrates an Iv-Iv cross-sectional view of FIG. 13(c).

Alternatively, as illustrated in FIGS. 8(a) to 8(d), the first current collector 6 may be connected to part of one group of positive-electrode layer stack sections 21a and 21b (one positive-electrode layer stack section 21a located in one region A in the case of FIG. 8(a), and the other positive-electrode layer stack section 21b located in the other region B in the case of FIG. 8(c)) located in one of the two groups of two regions A and B of one of adjacent two electrode assemblies 2, and may be connected to part of the other group of positive-electrode layer stack sections 21a and 21b (the other positive-electrode layer stack section 21b located in the other region B in the case of FIG. 8(a), and one positive-electrode layer stack section 21a located in one region A in the case of FIG. 8(c)) located in the other group of regions A and B on the opposite side of one of the two groups of regions A and B of the other of the adjacent two electrode assemblies 2. On the premise of such a mode of connection of the first current collector 6 with the electrode assemblies 2, the second current collector 7 may be connected to part of the other group of negative-electrode layer stack sections 23a and 23b (the other positive-electrode layer stack section 21b located in the other region B in the case of FIG. 8(b), and one positive-electrode layer stack section 21b located in one region A in the case of FIG. 8(d)) located in the other group of regions A and B on the opposite side of the one of the two groups of regions A and B of one of the adjacent two electrode assemblies 2, and may be connected to part of one group of negative-electrode layer stack sections 23a and 23b (one positive-electrode layer stack section 21a located in one region A in the case of FIG. 8(b), and the other positive-electrode layer stack section 21b located in the other region B in the case of FIG. 8(d)) located in the one of the two groups of regions A and B of the other one of the adjacent two electrode assemblies 2.

By providing two or more electrode assemblies 2 as described above, it is possible to provide a high-capacity battery cell 1 according to the number of electrode assemblies 2 and 2. In addition, in the battery cell 1 configured as described above, a single first current collector 6 and a single second current collector 7 are connected to two or more electrode assemblies 2 in either case. Thus, it is possible to reduce the number of components.

In the battery cell 1 provided with two or more electrode assemblies 2 and configured as described above, at least a layer stack composed only of the band-shaped negative electrode 20b and located in a position symmetrical to the connecting location between the first current collector 6 and the positive-electrode layer stack section 21a with respect to the second virtual plane F2 is held in an open state in either case, as in the above-described embodiments, in each electrode assembly 2. Likewise, at least a layer stack composed only of the band-shaped positive electrode 20a and located in a position symmetrical to the connecting location between the second current collector 7 and the negative-electrode layer stack section 23b with respect to the second virtual plane F2 is held in an open state. Accordingly, an electrolytic solution is made easy to infiltrate into each electrode assembly 2. In addition, gases generated due to electrical charge can be easily exhausted from the electrode assemblies 2. Thus, it is possible to stabilize the output power of the battery cell 1 as a whole.

In the above-described embodiment, current collectors provided with current collector bodies 60 and 70 including bases 600 and 700 fixed to the cover plate 31 and electrode assembly attachment portions 601 and 701 provided in continuity with one ends of the bases 600 and 700 and arranged along one end portion or the other end portion (the positive-electrode layer stack section 21a or the negative-electrode layer stack section 23b) of the electrode assembly 2 in the width direction thereof, and clip members 61 and 71 for coupling the electrode assembly attachment portions 601 and 701 with one end portion or the other end portion (the positive-electrode layer stack sections 21a and 21b or the negative-electrode layer stack sections 23a and 23b) of the electrode assembly 2 are adopted as the first current collector 6 and the second current collector 7. The embodiment is not limited to this configuration, however. For example, as illustrated in FIGS. 9(a) and 9(b), there may be adopted current collectors (those composed only of current collector bodies 60 and 70 in the above-described embodiment) including bases 600 and 700 fixed to the cover plate 31 through connecting means 8 and provided in continuity with one ends of the bases 600 and 700 and arranged along one end portion or the other end portion (the positive-electrode layer stack sections 21a and 21b or the negative-electrode layer stack sections 23a and 23b) of the electrode assembly 2 in the width direction thereof, and electrode assembly attachment portions 601 and 701.

In this configuration, the current collectors 6 and 7 should be electrically connected to the electrode assembly 2 by integrally welding (by means of spot welding W) the electrode assembly attachment portions 601 and 701 and one end portion or the other end portion (the positive-electrode layer stack sections 21a and 21b or the negative-electrode layer stack sections 23a and 23b) of the electrode assembly 2, as illustrated in FIG. 9(a), or by caulking the electrode assembly attachment portion 601, so as to circumvolute one end portion or the other end portion (the positive-electrode layer stack sections 21a and 21b or the negative-electrode layer stack sections 23a and 23b) of the electrode assembly 2, as illustrated in FIG. 9(b). Alternatively, the electrode assembly attachment portion 601 may be caulked so as to circumvolute one end portion or the other end portion (the positive-electrode layer stack sections 21a and 21b or the negative-electrode layer stack sections 23a and 23b) of the electrode assembly 2. In addition, the electrode assembly attachment portions 601 and 701 may be welded (by means of spot welding W) integrally with one end portion or the other end portion (the positive-electrode layer stack sections 21a and 21b or the negative-electrode layer stack sections 23a and 23b) of the electrode assembly 2. Needless to say, the connecting location between the first current collector 6 (electrode assembly attachment portion 601) and the positive-electrode layer stack sections 21a and 21b and the connecting location between the second current collector 7 (electrode assembly attachment portion 701) and the negative-electrode layer stack sections 23a and 23b should be made asymmetrical to each other with respect to the second virtual plane F2 passing through the center of the electrode assembly 2 in the width direction thereof and being orthogonal to the first virtual plane F1, even when these types of current collectors 6 and 7 are adopted.

In the respective drawings used to describe the battery cell 1 of the above-described embodiments, there has been shown the electrode assembly 2 wound with the band-shaped negative electrode 20b positioned on the outer side of the band-shaped positive electrode 20a. The embodiments are not limited to this configuration, however. For example, there may be adopted the electrode assembly 2 wound with the band-shaped positive electrode 20a positioned on the outer side of the band-shaped negative electrode 20b. That is, one of the band-shaped positive electrode 20a and the band-shaped negative electrode 20b constituting the electrode assembly 2 may be arranged on the outer side of the other one thereof according to the design specifications of the battery cell 1, so that the connecting location between the first current collector 6 (electrode assembly attachment portion 601) and the positive-electrode layer stack section 21a and the connecting location between the second current collector 7 (electrode assembly attachment portion 701) and the negative-electrode layer stack section 23b are set asymmetrical to each other with respect to the second virtual plane F2 passing through the center of the electrode assembly 2 in the width direction thereof and being orthogonal to the first virtual plane F1.

Although no particular reference has been made in the description given above, it is needless to say that each type of battery cell 1, including the battery cell 1 of the above-described embodiments, is employed as a power supply source for supplying power to electrical loads (such as electric motors, electric lamps, and display devices). Alternatively, as illustrated in FIG. 10, each type of battery cell 1 is provided as the abovementioned power supply source for various types of devices D (such as electric vehicles (EV), hybrid electric vehicles (HEV), aircraft, vessels, and industrial machinery) equipped with a power supply source for supplying power to electrical loads (for example, an electric motor M, an electric lamp L, and a display device E) through a wiring system EL. Note that as one example of the device D provided with any one of the above-described battery cells 1 as a power supply source, FIG. 10 illustrates a schematic view of an electric vehicle.

When any of the above-described battery cells 1 is equipped on the device D as a power supply source, the battery cell 1 is preferably installed with the winding center CL of the electrode assembly 2 extending laterally as in the above-described embodiments. That is, if the battery cell 1 is installed with the winding center CL of the electrode assembly 2 extending laterally, the height of positive-electrode layer stack sections 21a and 21b located at one end portion of the electrode assembly 2 in a direction in which the winding center CL extends and the height of negative-electrode layer stack sections 23a and 23b located at the other end portion of the electrode assembly 2 in the same direction are at the same or substantially the same level. Consequently, in the battery cell 1 which the abovementioned device D is provided with, an electrolytic solution more efficiently infiltrates from both ends of the electrode assembly 2 in the winding center CL direction thereof. In addition, gases generated due to electrical charge and discharge are more efficiently exhausted from both ends of the electrode assembly 2 in the winding center CL direction thereof.

Accordingly, in the device D equipped with the battery cell 1 as a power supply source, power supplied to an electrical load from the battery cell 1 is stabilized, and therefore, the device D can offer the highest possible performance.

REFERENCE SIGNS LIST

1: Battery cell, 2: Electrode assembly, 3: Cell case, 4: Positive-electrode external terminal structure, 5: Negative-electrode external terminal structure, 6: First current collector, 7: Second current collector, 8: Connecting means (rivet), 20a: Band-shaped positive electrode, 20b: Band-shaped negative electrode, 20c: Separator, 21a, 21b: Positive-electrode layer stack section, 22a, 22b: Circular arc-shaped positive-electrode layer stack section, 23a, 23b: Negative-electrode layer stack section, 24a, 24b: Circular arc-shaped negative-electrode layer stack section, 30: Case body, 31: Cover plate, 40, 50: External terminal, 41, 51: Connecting fitting, 60, 70: Current collector body, 61, 71: Clip member, 600, 700: Base, 601, 701: Electrode assembly attachment portion, 610a, 610b, 710a, 710b: Opposed piece, A, B: Region, CL: Winding center, F1: First virtual plane, F2: Second virtual plane, P: Insulating gasket

The invention claimed is:

1. A battery cell comprising:
at least one electrode assembly formed by flatly winding a band-shaped positive electrode and a band-shaped negative electrode stacked with a separator therebetween;
a cell case in which the electrode assembly is housed;
a positive-electrode external terminal structure arranged outside the cell case;
a negative-electrode external terminal structure arranged outside the cell case;
a first current collector electrically connected to a layer stack composed only of the band-shaped positive electrode and located on one end side of the electrode assembly in a width direction thereof, and electrically connected to the positive-electrode external terminal structure, the width direction being parallel to a winding axis of the electrode assembly; and
a second current collector electrically connected to a layer stack composed only of the band-shaped negative electrode and located on the other end side of the electrode assembly in the width direction, and electrically connected to the negative-electrode external terminal structure, wherein
a cross-section of the electrode assembly orthogonal to the winding axis has a short axis and a long axis,
the first current collector is connected to any one of: part of both of a pair of positive-electrode layer stack sections; part of any one of the pair of positive-electrode layer stack sections; and the whole of any one of the pair of the positive-electrode layer stack sections, of the layer stack composed only of the band-shaped positive electrode, the pair of the positive-electrode layer sections extending in a direction of the long axis respectively in two regions bounded by a first virtual plane passing through the winding axis and the long axis of the electrode assembly, the second current collector is connected to any one of: part of both of a pair of negative-electrode layer stack sections; part of any one of the pair of negative-electrode layer stack sections; and the whole of any one of the pair of the negative-electrode layer stack sections, of the layer stack composed only of the band-shaped negative electrode, the pair of the negative-electrode layer stack sections extending in the direction of the long axis respectively in the two regions,
a connecting location between the first current collector and the positive-electrode layer stack section and a connecting location between the second current collector and the negative-electrode layer stack section are set so as to be asymmetrical to each other with respect to a second virtual plane passing through a center of a width of the electrode assembly and being orthogonal to the first virtual plane and the winding axis, the width being a length of the electrode assembly in the width direction,
a portion of the negative-electrode layer stack section located in a position symmetrical to the connecting location between the first current collector and the positive-electrode layer stack section with respect to the second virtual plane is held in an open state from one end to the other end in a direction of the short axis, and
a portion of the positive-electrode layer stack section located in a position symmetrical to the connecting location between the second current collector and the negative-electrode layer stack section with respect to the second virtual plane is held in an open state from one end to the other end in a direction of the short axis.

2. The battery cell according to claim 1, wherein:
the first current collector is connected to part or the whole of one positive-electrode layer stack section located in one region of the two regions, and the second current collector is connected to part or the whole of the other negative-electrode layer stack section located in the other region on the opposite side of the one region of the two regions.

3. The battery cell according to claim 1, wherein:
the first current collector is connected to a side lower than an upper portion of the positive-electrode layer stack section in the direction of the long axis, and the second current collector is connected to a side lower than an upper portion of the negative-electrode layer stack section in the direction of the long axis.

4. The battery cell according to claim 1, wherein:
the first current collector is connected to part of one positive-electrode layer stack section located in any one region of the two regions, and the second current collector is connected to part of one negative-electrode layer stack section located in any one region of the two regions.

5. The battery cell according to claim 1, wherein:
the first current collector is connected to part of both of the pair of positive-electrode layer stack sections located in the two regions, and the second current collector is connected to part of both of the pair of negative-electrode layer stack sections located in the two regions.

6. The battery cell according to claim 1, wherein:
the electrode assembly comprises two or more electrode assemblies;
the two or more electrode assemblies are arranged in parallel with each other, so that the respective positive-electrode layer stack sections and the respective negative-electrode layer stack sections thereof are aligned to each other and the respective first virtual planes thereof are parallel or substantially parallel to each other; and
the first current collector is connected to part of one positive-electrode layer stack section located in any one region of the two regions of each of the electrode assemblies, and the second current collector is connected to part of one negative-electrode layer stack section located in any one region of the two regions of each of the electrode assemblies.

7. The battery cell according to claim 1, wherein:
the electrode assembly comprises two or more electrode assemblies;

the two or more electrode assemblies are arranged in parallel with each other, so that the respective positive-electrode layer stack sections and the respective negative-electrode layer stack sections thereof are aligned to each other and the respective first virtual planes thereof are parallel or substantially parallel to each other; and the first current collector is connected to part of one positive-electrode layer stack section located in one region of the two regions of one of adjacent two electrode assemblies and to part of the other positive-electrode layer stack section located in the other region on the opposite side of the one region of the two regions of the other of the adjacent two electrode assemblies, and a second current collector is connected to part of the other negative-electrode layer stack section located in the other region on the opposite side of the one region of the two regions of one of the adjacent two electrode assemblies and to part of one negative-electrode layer stack section located in the one region of the two regions of the other of the adjacent two electrode assemblies.

8. The battery cell according to claim 1, configured to be installable with the winding axis of an electrode assembly extending laterally.

9. A device comprising a battery cell as a power supply source for supplying power to an electrical load, wherein:
the battery cell is configured using the battery cell according to claim 1, and is installed with the winding axis of an electrode assembly extending laterally.

10. The battery cell according to claim 1, wherein:
the first current collector is connected to a side lower than an upper portion of one positive-electrode layer stack section in the direction of the long axis located in one region of the two regions, and the second current collector is connected to the side lower than the other upper portion of the negative-electrode layer stack section in the direction of the long axis located in the other region on the opposite side of the one region of the two regions.

11. The battery cell according to claim 1, wherein:
the first current collector is connected to the whole of one positive-electrode layer stack section located in one region of the two regions, and the second current collector is connected to the whole of the other negative-electrode layer stack section located in the other region on the opposite side of the one region of the two regions.

12. The battery cell according to claim 1, wherein:
the first current collector is connected to a side upper than a lower portion of the positive-electrode layer stack section in the direction of the long axis, and the second current collector is connected to a side upper than a lower portion of the negative-electrode layer stack section in the direction of the long axis.

13. The battery cell according to claim 1, wherein:
the first current collector is connected to a side upper than a lower portion of one positive-electrode layer stack section in the direction of the long axis located in one region of the two regions, and the second current collector is connected to a side upper than a lower portion of the other negative-electrode layer stack section in the direction of the long axis located in the other region on the opposite side of the one region of the two regions.

14. The battery cell according to claim 1, wherein:
the first current collector is connected to one of an upper portion and a lower portion of the positive-electrode layer stack section in the direction of the long axis, and the second current collector is connected to the other of the upper portion and the lower portion of the negative-electrode layer stack section in the direction of the long axis.

15. The battery cell according to claim 1, wherein:
the first current collector is connected to one of an upper portion and a lower portion of one positive-electrode layer stack section in the direction of the long axis located in one region of the two regions, and the second current collector is connected to the other of the upper portion and the lower portion of the other negative-electrode layer stack section in the direction of the long axis located in the other region on the opposite side of the one region of the two regions.

16. The battery cell according to claim 1, wherein:
the first current collector is connected to one of an upper portion and a lower portion of one positive-electrode layer stack section in the direction of the long axis located in one region of the two regions, and the second current collector is connected to the other of the upper portion and the lower portion of the other negative-electrode layer stack section in the direction of the long axis located in the one region of the two regions.

17. The battery cell according to claim 1, wherein:
the first current collector is connected to one of an upper portion and a lower portion of one positive-electrode layer stack section in the direction of the long axis located in one region of the two regions, and to the other of the upper portion and the lower portion of the other positive-electrode layer stack section in the direction of the long axis located in the other region on the opposite side of the one region of the two regions; and
the second current collector is connected to one of an upper portion and a lower portion of the other negative-electrode layer stack section in the direction of the long axis located in the other region of the two regions, and to the other of the upper portion and the lower portion of one negative-electrode layer stack section in the direction of the long axis located in the one region of the two regions.

18. The battery cell according to claim 1, wherein:
the first current collector is connected to one of an upper portion and a lower portion of one positive-electrode layer stack section in the direction of the long axis located in one region of the two regions, and to one of the upper portion and the lower portion of the other positive-electrode layer stack section in the direction of the long axis located in the other region on the opposite side of the one region of the two regions; and
the second current collector is connected to the other of an upper portion and a lower portion of the other negative-electrode layer stack section in the direction of the long axis located in the other region of the two regions, and to the other of the upper portion and the lower portion of one negative-electrode layer stack section in the direction of the long axis located in the one region of the two regions.

* * * * *